United States Patent [19]

Hara et al.

[11] 4,353,802

[45] Oct. 12, 1982

[54] SEMIPERMEABLE COMPOSITE MEMBRANE

[75] Inventors: Shigeyoshi Hara; Yuzuru Hayashi; Takeyuki Kawaguchi; Noriaki Sasaki; Yutaka Taketani; Hiroyoshi Minematsu, all of Iwakuni, Japan

[73] Assignee: Teijin Limited, Osaka, Japan

[21] Appl. No.: 86,192

[22] Filed: Oct. 18, 1979

[30] Foreign Application Priority Data

Oct. 18, 1978 [JP] Japan .................................. 53-127300

[51] Int. Cl.$^3$ ............................................. B01D 13/00
[52] U.S. Cl. .................................. 210/654; 210/500.2; 427/246
[58] Field of Search ............... 210/500.2, 654; 521/27, 521/32; 428/413, 414; 260/37 EP; 264/45.5, 48; 427/244, 245, 246

[56] References Cited

U.S. PATENT DOCUMENTS

| | | | |
|---|---|---|---|
| 2,630,429 | 3/1953 | Hwa | 521/32 |
| 3,580,841 | 5/1971 | Capotte et al. | 210/655 |
| 4,005,012 | 1/1977 | Wrasipio | 210/500.2 X |
| 4,265,745 | 5/1981 | Kawaguchi et al. | 210/654 |

Primary Examiner—Frank A. Spear, Jr.

Attorney, Agent, or Firm—Sughrue, Mion, Zinn, Macpeak & Seas

[57] ABSTRACT

A semipermeable composite membrane comprising a thin semipermeable film of a polymeric material deposited on one side of a microporous substrate, the polymeric material being prepared by crosslinking a soluble polymer containing at least 30 mole % of a recurring unit of the formula

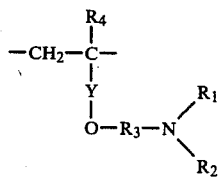

wherein all symbols are as defined herein, and having at least 0.5 milliequivalent, per gram of said polymer, of an amino group containing 1 or 2 active hydrogen atoms, with a polyfunctional compound containing at least two functional groups capable of reacting with the amino group having 1 or 2 active hydrogen atoms; and a process for preparing the same. The semipermeable composite membrane of this invention is especially useful for desalination of saline or brackish water by reverse osmosis.

31 Claims, No Drawings

SEMIPERMEABLE COMPOSITE MEMBRANE

TECHNICAL FIELD

This invention relates to a novel semipermeable composite membrane. More specifically, this invention pertains to a novel semipermeable composite membrane which has high performances in selective permeability characteristics such as water flux and salt rejection particularly suitable for reverse osmosis, chemical resistances such as oxidation resistance, acid resistance and alkali resistance, compactness, and thermal stability, and which can be stored in the dry state; to a process for production thereof; and to use of the aforesaid composite membrane in reverse osmosis.

BACKGROUND ART

The semipermeable membrane is a membrane which has selective permeability to specified molecules. It is frequently used to remove very small amounts of contaminated molecules dissolved or diffused in a liquid or gas.

In recent years, reverse osmosis has attracted a great deal of interest for utilization in fields involving purification of liquids. This is of especial importance when utilizing this system in the purification of water and brackish water. Likewise, the process is also used to remove impurities from liquids such as water or, in the fields of dialysis, blood. When utilizing reverse osmosis in the purification of a brackish water, a pressure in excess of the osmotic pressure of the brackish water feed solution is applied to the solution which is prepared from purified water by a semipermeable membrane. Pure water thereby diffuses through the membrane while the sodium chloride molecules or other impurities which may be present in the water are retained by the membrane.

The efficiency of the reverse osmosis method is greatly affected by the properties of the semipermeable membrane used. Much effort has therefore been made to develop membranes having high performance, and resulted in some specific suggestions.

For example, U.S. Pat. Nos. 3,133,132 and 3,133,137 disclose the early Loeb-type membranes made of cellulose diacetate. These membranes are asymetric membranes which are characterized by a very thin, dense surface layer or skin that is supported upon an integrally attached, much thicker supporting layer. These known membranes based on cellulose diacetate have the defect of poor compaction, low resistance to chemical and biological degradation, a short useful like, inability of storage in the dry state, and insufficient flux and salt rejection characteristics.

In an attempt to overcome these defects of the Loeb-type membranes, some membranes composed basically of synthetic polymers have recently been suggested. For example, U.S. Pat. No. 3,951,815 discloses a composite semipermeable membrane comprising a microporous substrate and an ultrathin film formed of a crosslinked, grafted polyethylenimine disposed on one surface of said microporous substrate that has been crosslinked with a di- or tri-functional compound such as isophthaloyl chloride and grafted with a graft reactant such as acrylonitrile or epichlorohydrin. U.S. Pat. No. 4,005,012 describes a composite semipermeable membrane comprising an ultrathin film formed by contacting an amine-modified polyepihalohydrin with a polyfunctional agent on a microporous substrate to form this film on one surface of the microporous substrate. Also, U.S. Pat. No. 4,039,440 discloses a reverse osmosis membrane prepared in situ on a porous support by initial formation of a layer of polyethylenimine on the support, followed by interfacial reaction with a polyfunctional reagent to produce a thin surface coating which possesses salt barrier characteristics.

The membrane composed basically of crosslinked polyethylenimine disclosed in U.S. Pat. No. 4,039,440 has a high salt rejection, but has the defect of insufficient flexibility and low oxidation resistance (e.g., low resistance to deterioration by the presence of chlorine in the feed saline or brackish water). As one method of improving the oxidation resistance, U.S. Pat. No. 3,951,815 suggests the grafting of acrylonitrile to the poolyethylenimine. The acrylonitrile-grafted and cross-linked polyethylenimine shows some improvement in oxidation resistance, but as the membrane is operated continuously for a long period of time, its degradation advances gradually. Moreover, it suffers from the serious defect of having a reduced water flux.

The membrane composed basically of the amine-modified polyepihalohydrin disclosed in U.S. Pat. No. 4,005,012 exhibits a high salt rejection but its dry-wet-reversibility is not sufficient. It has been strongly desired to develop membranes having a superior dry-wet-reversibility.

The characteristics required of semipermeable membranes are basically high permselectivity and a high flux. In addition, they should have high resistance to compaction, superior resistance to chemical and biological degradation, sufficient flexibility to endure shaping into modules in actual use such as a tube, spiral or hollow filament, and sufficient dry-wet-reversibility. The membranes so far suggested lack one or more of these characteristics, and are not entirely satisfactory for use as semipermeable membranes.

Accordingly, it has been strongly desired in the art to develop membranes having a combination of the aforesaid desired characteristics.

DISCLOSURE OF THE INVENTION

It is an object of this invention to provide an improved semipermeable membrane.

Another object of this invention is to provide a semipermeable composite membrane having high permselectivity and flux, superior flexibility, high resistance to compaction, high resistance to chemical and biological degradation, excellent storability in the dry state and superior dry-wet-reversibility especially high permeselectivity, superior resistance to oxidation and/or superior dry-wet-reversibility.

Still another object of this invention is to provide a process for producing a semipermeable composite membrane having high permselectivity and flux, superior flexibility, high resistance to compaction, high resistance to chemical and biological degradation, and storability in the dry state.

A further object of this invention is to provide a method for using the aforesaid semipermeable composite membrane for the reverse osmotic desalination of saline or brackish water.

Other objects and advantages of this invention will become apparent from the following description.

According to this invention, there is provided a semipermeable composite membrane comprising a thin semipermeable film of a polymeric material deposited on one side of a microporous substrate, said polymeric material being prepared by crosslinking a soluble polymer with a polyfunctional compound, wherein said soluble polymer contains at least 30 mole% of a recurring unit of the formula

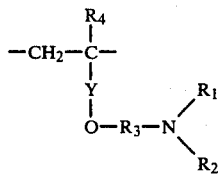 (I)

wherein Y represents a direct bond, methylene group, an unsubstituted or substituted phenylene group or carbonyl group (>C=O); $R_1$ represents a hydrogen atom, or a monovalent organic radical containing 1 to 20 carbon atoms which may contain an amino group containing 1 to 2 active hydrogen atoms and a heteroatom selected from the group consisting of oxygen, nitrogen and sulfur atoms, $R_2$ represents a hydrogen atom, an amino group containing 1 to 2 active hydrogen atoms or a monovalent organic radical containing 1 to 20 carbon atoms which contains an amino group containing 1 to 2 active hydrogen atoms and may contain a heteroatom selected from the group consisting of oxygen, nitrogen and sulfur atoms, or $R_1$ and $R_2$, together with the nitrogen atom to which they are bonded, represent a 5- to 18-membered nitrogen-containing heterocyclic ring which contains at least one amino group having one active hydrogen atom, $R_3$ represents an alkylene group containing 2 to 5 carbon atoms which may have —OH group; and $R_4$ represents a hydrogen atom or a methyl group, and having at least 0.5 milliequivalent, per gram of said polymer, of an amino group containing 1 to 2 active hydrogen atoms, and said polyfunctional compound contains at least two functional groups capable of reacting with the amino group having 1 or 2 active hydrogen atoms.

The essential feature of the present invention consists in the use of a polymer, as a starting material for the semipermeable membrane, containing at least 30 mole% of the recurring unit of formula (I) in which a pendant chain containing at least one amino group having 1 or 2 active hydrogen atoms (to be sometimes referred to hereinbelow as an "active amino group") is bonded to the main chain of the polymer through ether or ester linkages.

The ether or ester linkages seem to contribute to the resulting membrane exhibiting the dry-wet-reversibility as well as the flexibility, co-operating with the alkylene linkages in the side chains.

Since the polymer contains an active amino group in the pendant chain, crosslinking of the polymer with the polyfunctional compound (to be referred to as a "crosslinking agent") having functional groups such as acid halide, sulfonyl halide, N-haloformyl, haloformate and acid anhydride groups easily changes the active amino group to a linkage such as a carbonamide (or -imide) linkage

sulfonamide linkage

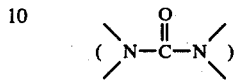

urea linkage

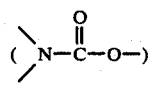

or urethane linkage

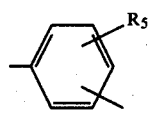

which could be stable to oxidation, and thus gives a crosslinking site having superior chemical stability such as oxidation resistance, simultaneously providing superior basic performances such as high water permeability and high salt rejection characteristics which are required of a reverse osmosis membrane.

DETAILED DESCRIPTION OF THE INVENTION

The essential feature of the present invention is the use of a polymer containing a recurring unit of the formula

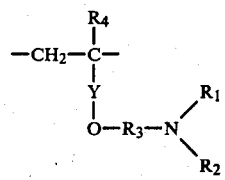 (I)

wherein Y, $R_1$, $R_2$, $R_3$ and $R_4$ are as defined above.

In formula (I), the group Y preferably represents a direct bond, a methylene group, a carbonyl group, a phenylene group of the formula

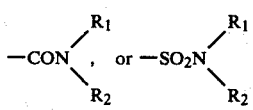

in which $R_5$ represents a hydrogen atom, —COOH, —SO$_3$H,

—CON$\begin{smallmatrix}R_1\\R_2\end{smallmatrix}$, or —SO$_2$N$\begin{smallmatrix}R_1\\R_2\end{smallmatrix}$ in which $R_1$ and $R_2$ are as defined above. Especially preferably, $R_5$ is a hydrogen atom.

In the formulae (I) the group

is derived from an amine of the formula (II), $$R_1\text{—NH—}R_2 \quad (II)$$

as will be stated hereinbelow. Accordingly, the group

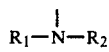

can represent a monovalent substituted amino group resulting from the removal of one active hydrogen atom from one amino group of an amino compound containing at least one active amino group. Thus, it can be said that $R_1$ and $R_2$ in the above formula are the remainder of the aforesaid amino compound left after the removal of the nitrogen atom to be bonded to the group $R_3$ and one active hydrogen atom bonded to this nitrogen atom. Specifically, $R_1$ represents a hydrogen atom or a monovalent organic radical containing 1 to 20 carbon atoms which may contain an amino group containing 1 to 2 active hydrogen atoms and a heteroatom selected from oxygen, nitrogen and sulfur atoms, and $R_2$ represents a hydrogen atom, an amino group containing 1 to 2 active hydrogen atoms, or a monovalent organic radical containing 1 to 20 carbon atoms which contains an amino group containing 1 to 2 active hydrogen atoms and may contain a heteroatom selected from oxygen, nitrogen and sulfur atoms, or $R_1$ and $R_2$, together with the nitrogen atom to which they are bonded, may represent a 5- to 18-membered nitrogen-containing heterocyclic ring which contains at least one amino group having one active hydrogen. More specifically, $R_1$ represents a hydrogen atom, an alkyl, cycloalkyl, aryl, aralkyl or heterocyclic radical containing 1 to 20 carbon atoms, preferably 1 to 12 carbon atoms, and optionally containing 1 to 8, preferably 1 to 5, heteroatoms or heteroatom-containing atomic groupings selected from the group consisting of thiol groups, sulfo groups, hydroxyl groups, cyano groups, carboxyl groups, alkoxycarbonyl groups with the alkyl moiety having 1 to 5 carbon atoms (e.g., —COOCH$_3$, —COOC$_2$H$_5$ and —COOC$_3$H$_7$), primary amino groups (—NH$_2$), ether linkages (—O—), imino linkages (—NH—) and tertiary amino linkages

and $R_2$ represents a hydrogen atom, a primary amino group, a secondary amino group mono-substituted by an alkyl group containing 1 to 5 carbon atoms, or an alkyl, cycloalkyl, aryl, aralkyl or heterocyclic radical containing 1 to 20, preferably 1 to 12, carbon atoms which contains 1 to 10, preferably 1 to 6, primary amino groups or imino linkages and may contain 1 to 9, preferably 1 to 6, heteroatoms or heteroatom-containing atomic groupings selected from the group consisting of thiol groups, sulfo groups, hydroxyl groups, cyano groups, carboxyl groups, alkoxycarbonyl groups containing 1 to 5 carbon atoms, ether linkages and tertiary amino linkages

or $R_1$ and $R_2$, together with the nitrogen atom to which they are bonded, may represent a 5- to 18-membered nitrogen-containing heterocyclic ring optionally containing 1 to 4 nitrogen or oxygen atoms as heteroatoms, such as

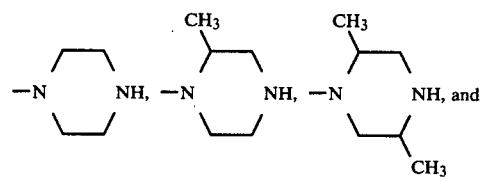

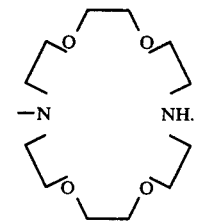

Typical examples of the groups $R_1$ and $R_2$ are given below. It should be understood that these examples are merely illustrated, and are not intended in any way to limit the scope of the present invention.

(1) Examples of $R_1$

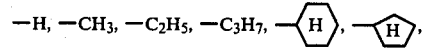

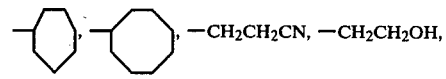

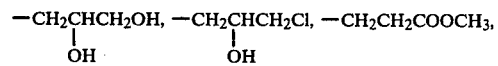

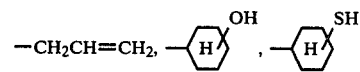

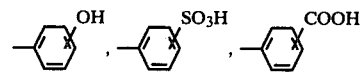

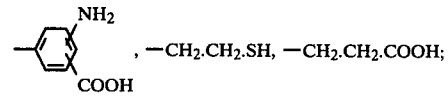

(2) Examples of $R_2$

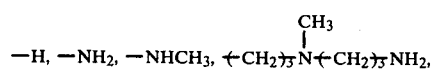

-continued

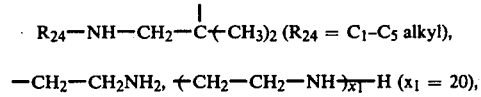

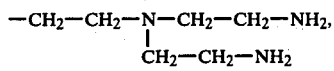

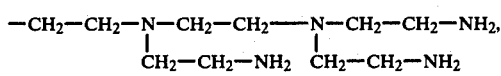

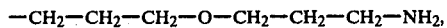

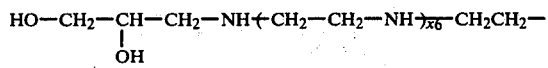

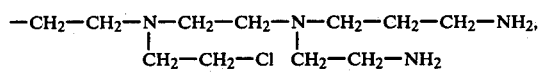

($x_4$-$x_8$ = an integer of 1-20)

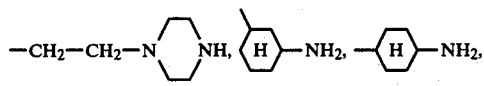

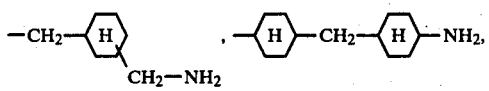

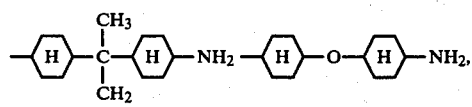

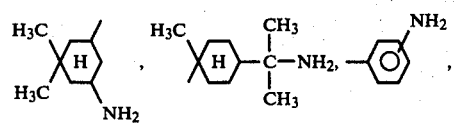

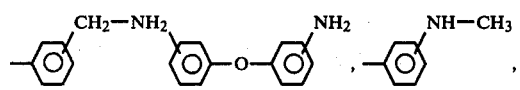

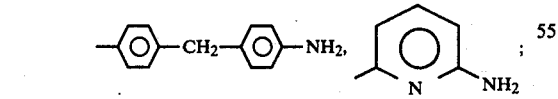

(3) Examples of the heterocyclic ring formed by $R_1$ and $R_2$

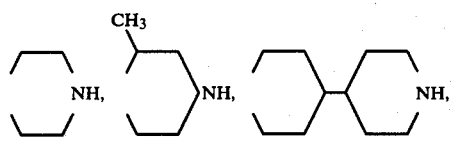

-continued

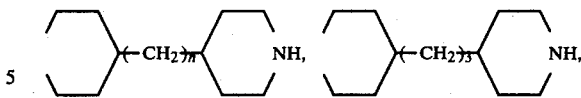

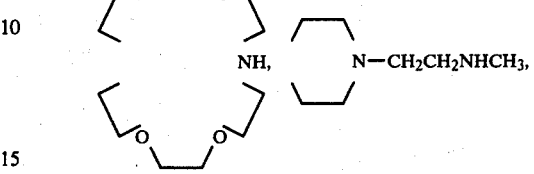

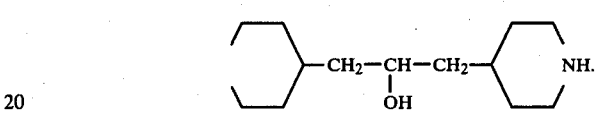

The term "alkyl group", used in the present specification and the appended claims, denotes a linear or branched saturated monovalent aliphatic hydrocarbon group, and includes, for example, methyl, ethyl, n- or iso-propyl, n-, iso-, sec- or tertbutyl, n-pentyl, iso-amyl, n-hexyl, and n-octyl.

The term "cycloalkyl group", as used herein, denotes a monovalent saturated alicyclic hydrocarbon group such as cyclopentyl, cyclohexyl, cycloheptyl or cyclooctyl.

The term "aryl" denotes a monocyclic or polycyclic aromatic hydrocarbon group such as phenyl, tolyl, xylyl or naphthyl.

The term "aralkyl group", as used herein, denotes an aryl-substituted lower alkyl group in which the aryl and alkyl have the same meanings as described above. Typical examples are benzyl and phenethyl.

The term "heterocyclic group", as used herein, denotes a monovalent cyclic group preferably with 5 or 6 members, in which at least one, preferably 1 to 2, ring members are heteroatoms such as oxygen or nitrogen, and the remainder of the ring members consists of carbon atoms. Specific examples are as follows:

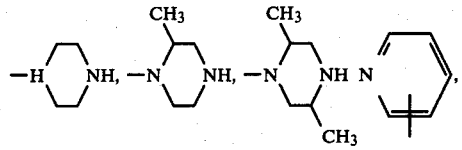

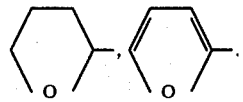

The term "lower", used in the present specification and appended claims to qualify groups or compounds, denotes that the groups or compounds so qualified have not more than 5, preferably not more than 3, carbon atoms.

The amino compound which will provide $R_1$ and $R_2$ contains at least one active amino group, i.e. primary amino groups (—$NH_2$) or secondary amino groups (—NH—, also called imino group), which can react with the polyfunctional compound.

When the amino compound contains only one active amino group, the amino group should be a primary amino group (—NH$_2$).

The amino compound used in this invention is not particularly limited in its type so long as it contains at least one of primary amino groups, secondary amino groups, or both per molecule. It may range from a low-molecular-weight compound to a high-molecular-weight compound, and may be linear or branched. It may further contain an aromatic ring, heterocyclic ring or alicyclic ring. The structural moiety of the amino compound excluding the reactive amino groups may contain heteroatoms such as oxygen and sulfur in addition to carbon and hydrogen atoms. The active amino groups can be present at the ends or side chains of the molecular chain, and secondary amino groups may be incorporated in the molecular chain.

The number of the primary and secondary amino groups that can be present in the amino compound may be at least one, and no strict upper limit is set up. However, from the standpoint of the characteristics, especially salt rejection, of the resulting membrane, the amino compound suitably has an "amino equivalent" of generally 5 to 40 milliequivalents (to be abbreviated "meq") per gram of the amino compound, preferably 15 to 35 meq/g, especially preferably 20 to 30 meq/g.

The term "amino equivalent", as used in the present specification, denotes the sum of the equivalents of primary and secondary amino groups contained per gram of the amino compound. The sum of the equivalents of the primary and secondary amino groups can be determined generally by a known determination method (such as the perchloric acid-glacial acetic acid method, or the azomethine method).

Desirably, when the amino compound contains more than 1 amino group, the two or more active amino groups present in the amino compound should not be spaced from one another too far. It is advantageous that the number of carbon atoms which constitute the chain connecting two adjacent active amino groups in the same molecule is generally not more than 15, preferably not more than 10, and more preferably 2 to 5.

The molecular weight of the amino compound is neither critical, and may range from a low molecular weight to a high molecular weight. From the standpoint of the characteristics, especially oxidation resistance, of the resulting membrane, suitable amino compounds have a molecular weight of generally not more than 1000, preferably 30 to 500, especially preferably 40 to 300.

Amino compounds that can be used in this invention can be selected from any known amino compounds which have the aforesaid characteristics. Typical examples are given below. We do not intend however to limit the scope of the invention by the following exemplification.

(1) Monoamines

CH$_3$NH$_2$, C$_2$H$_5$NH$_2$, C$_3$H$_7$NH$_2$, C$_4$H$_9$NH$_2$, HO.CH$_2$.CH$_2$.NH$_2$,

HS.CH$_2$.CH$_2$.NH$_2$, HOOC.CH$_2$.CH$_2$.NH$_2$, HOOC.CH$_2$.NH$_2$,

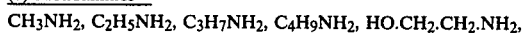

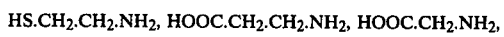

(2) Aliphatic polyamines

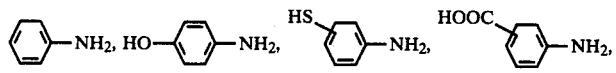

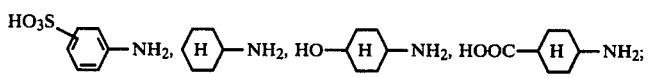

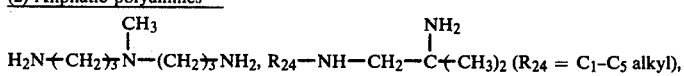

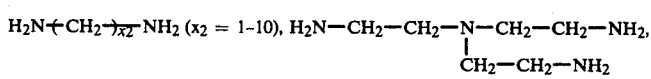

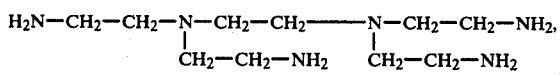

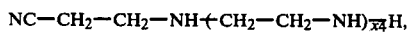

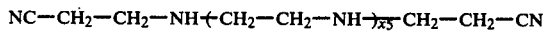

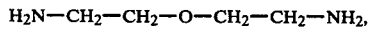

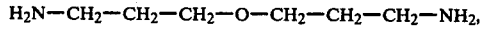

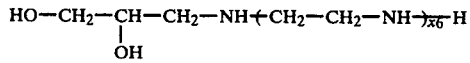

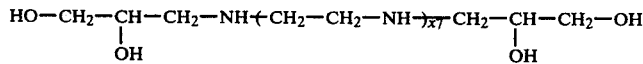

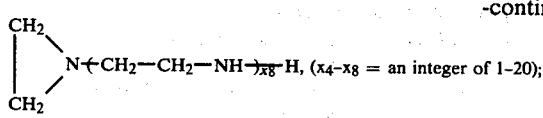
(3) Alicyclic polyamines
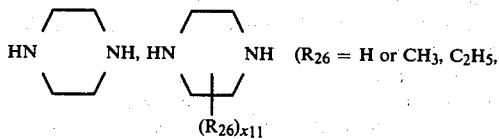
$x_{11}$ = an integer of 1-8),
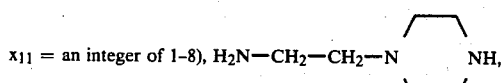
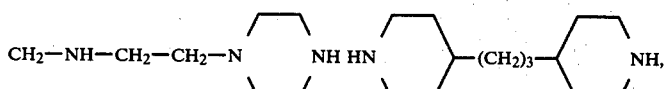
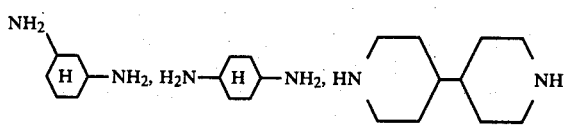
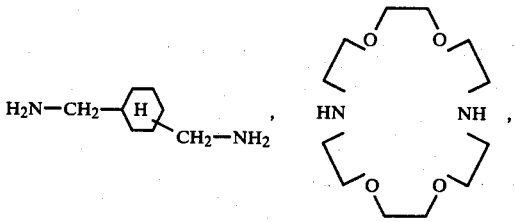
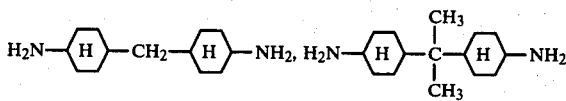
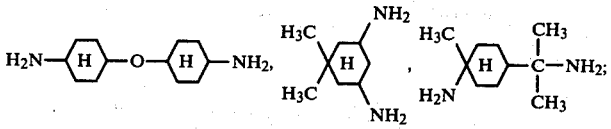
(4) Aromatic polyamines
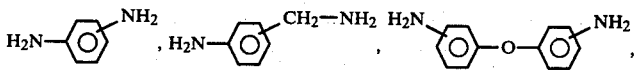
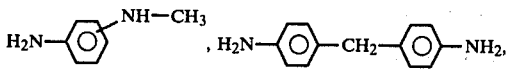
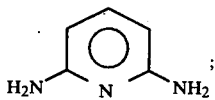
;
(5) Hydrazines
H₂N.NH, H₂N.NHCH₃, CH₃.NH.NH.CH₃.
These amino compounds can be used either alone or as a mixture of two or more.
Amino compounds that can be used advantageously in this invention are aliphatic or alicyclic amino compounds expressed by the following formula (II-a), (II-b) or (II-c).

$$A_1-NH-A_2-NH_2 \quad \text{(II-a)}$$

$$NH_2\!\!-\!\!(CH_2-CH_2-N)_{\overline{i}}A_3 \quad \text{(II-b)}$$
$$\quad\quad\quad\quad\quad\;\; |$$
$$\quad\quad\quad\quad\quad\;\; A_4$$

$$A_5-NH_2 \quad \text{(II-c)}$$

wherein $A_1$ represents a hydrogen atom or a lower alkyl group; $A_2$ represents an alkylene group having 2 to 10 carbon atoms which may contain an ether linkage; $A_3$ represents a hydrogen atom or a lower alkyl group optionally substituted with a cyano, hydroxyl or lower alkoxycarbonyl group; $A_4$ represents a hydrogen atom or a group of the formula $-CH_2-CH_2-NH-A_3$, with the proviso that $A_3$ and $A_4$ do not represent hydrogene atoms simultaneously; $A_5$ represents an alkyl group with 1 to 4 carbon atoms, a phenyl group or a cycloalkyl group with 5 to 6 carbon atoms, wherein each group may contain a subsituent group selected acid groups of $-SO_3H$ and COOH, alkali metal salts of said acid groups, alkali earth metal salts of said acid groups, ammonium salts of said acid groups, $-SH$ and $-OH$, with the proviso that the alkyl group does not contain $-SO_3H$ and its salts, the phenyl group does not contain $-SH$ and $-OH$, and the cycloalkyl group does not contain $-SO_3H$, its salts and $-SH$; and i is an integer of 2 to 6.

The amino compound of the formula (II-a) is preferable from a viewpoint that it is useful to obtain the membrane with a higher salt-rejection.

The amino compound of the formula (II-b) is preferable from a viewpoint that it is useful to obtain the membrane with a higher water-flux, especially when $A_4$ is a hydrogen atom and i is the integer larger than 2 preferably larger than 3.

The amino compound of the formula (II-c) is preferable from a viewpoint that it is useful to obtain the membrane with a high chlorine-resistance.

Typical examples of the amino compounds of formulae (II-a) (II-c) includes the following.

Type (II-a)

$H_2NCH_2CH_2NH_2$, $H_2NCH_2CH_2CH_2NH_2$, $H_2N(CH_2)_4NH_2$, $NH_2CH_2CH_2NHCH_3$, $CH_3NHCH_2CH_2CH_2NH_2$, $CH_3NHCH_2CH_2CH_2CH_2NH_2$, $C_2H_5NHCH_2CH_2NH_2$, $C_2H_5NHCH_2CH_2CH_2NH_2$, $C_2H_5NHCH_2CH_2CH_2CH_2NH_2$, $HOCH_2CH_2NHCH_2CH_2CH_2NH_2$, $HOCH_2CH_2NHCH_2CH_2CH_2CH_2NH_2$, $H_2NCH_2CH_2-O-CH_2CH_2NH\;C_2H_5$, $CH_3NH-CH_2CH_2-OCH_2CH_2NH_2$, $HOCH_2CH_2NHCH_2CH_2NH_2$.

Type (II-b)

$H_2N\!\!-\!\!(CH_2CH_2NH)_{\overline{2}}H$, $H_2N\!\!-\!\!(CH_2CH_2NH)_{\overline{3}}H$ $NH_2\!\!-\!\!(CH_2CH_2NH)_{\overline{2}}CH_3$, $NH_2\!\!-\!\!(CH_2CH_2NH)_{\overline{3}}CH_3$, $NH_2\!\!-\!\!(CH_2CH_2NH)_{\overline{4}}CH_3$, $NH_2CH_2CH_2CH_2NCH_2CH_2NHCH_3$,
$\quad\quad\quad\quad\quad\quad\quad\quad\quad\quad\quad\quad |$
$\quad\quad\quad\quad\quad\quad\quad\quad\quad\quad\quad\quad CH_2CH_2NHCH_3$ $H_2N\!\!-\!\!(CH_2CH_2NH)_{\overline{4}}H$, $H_2N-CH_2CH_2N-CH_2CH_2NH_2$
$\quad\quad\quad\quad\quad\quad\quad\quad\quad\quad\quad\quad\quad\;\;\; |$
$\quad\quad\quad\quad\quad\quad\quad\quad\quad\quad\quad\quad\quad\;\;\; CH_2CH_2NH_2$ $NH_2\!\!-\!\!(CH_2CH_2NH)_{\overline{2}}CH_2CH_2OH$, $NH_2\!\!-\!\!(CH_2CH_2NH)_{\overline{3}}CH_2CH_2OH$, Type (II-c)

$CH_3NH_2$, $C_2H_5NH_2$, $HOCH_2CH_2NH_2$, $HS.CH_2CH_2.NH_2$,

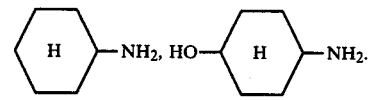

Typical examples of the recurring units of the formula (I) are shown as below.

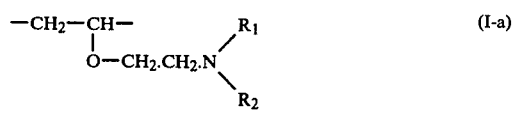  (I-a)

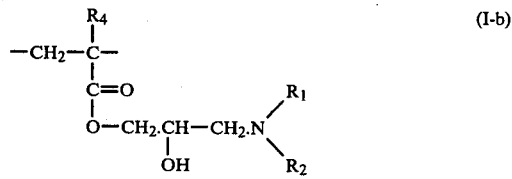  (I-b)

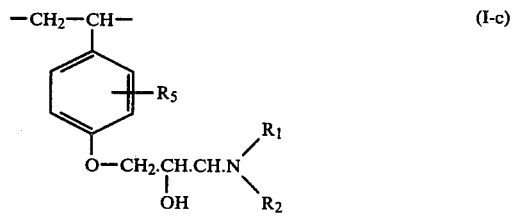  (I-c)

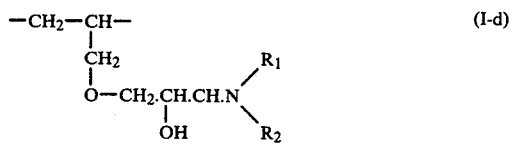  (I-d)

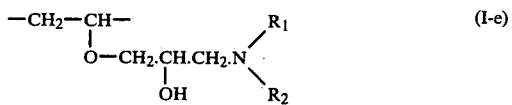  (I-e)

The recurring units of the formulae (I-a)–(I-e) are preferable in that they give a good wet-dry-reversibility to the resulting membrane.

Of the recurring units, the units of the formulae (I-a) and (I-e) are more preferable in that they give the membrane with high salt-rejection.

The soluble polymer used in this invention may contain at least 30 mole%, preferably at least 50 mole%, more preferably at least 70 mole%, of a recurring unit of formula (I), including formulae (I-a), (I-b), (I-c), (I-d) and (I-e). Those which are substantially linear are suitable. In the present invention, polymers substantially composed only of the recurring units of formula (I), and copolymers composed of the recurring unit of formula (I) and another monomeric unit copolymerizable with the unit of formula (I) can be used so long as they contain the recurring unit of formula (I) in the molar proportions specified above. The other monomeric units copolymerizable with the recurring unit of formula (I) in the soluble polymer are described hereinbelow.

In the present invention, the molecular chain of polymer contains at least 30 mole% of the unit of formula (I). Preferably, the units of formula (I) are distributed as uniformly as possible in the polymer chain.

The recurring unit of formula (I) can be present in the polymer in such a proportion that the amount of "amino groups containing 1 to 2 active hydrogens" present in the group

in the pendant chain (i.e., active amino groups) is at least 0.2 milliequivalent (meq.), preferably 0.5 to 10 meq., more preferably 1 to 5 meq., per gram of the polymer.

Very desirably, the polymer used in this invention should be a soluble polymer which dissolves to some extent in water or water-miscible polar organic solvents in an amount of at least 0.1 g, preferably at least 0.5 g, more preferably at least 1.0 g, at 25° C. per 100 g of water or the organic solvent.

The dissolving of the polymer means not only the complete dissolving of the polymer in molecular form in a given solvent to form a true solution, but also the dispersion of the polymer in the form of a colloid, latex or emulsion which can be coated on a microporous substrate (to be described hereinbelow) to form a coating thereon.

Typical examples of the water-miscible polar organic solvent used to determine the solubility of the polymer include lower alcohols such as methanol, ethanol, n-propanol and iso-propanol, formic acid, dimethylformamide (DMF), dimethylsulfoxide (DMSO), tetramethylenesulfone, and N-methylpyrrolidone (NMP). These organic solvents may contain up to about 10% by weight of water.

The polymer used in this invention is not strictly limited in its molecular weight (degree of polymerization) if it has the solubility specified above and film-forming ability. Generally, the polymer desirably has an inherent viscosity $$\left( \eta_{inherent} = \frac{\ln \eta_{rel.}}{\text{concentration of polymer}} \right)$$

in formic acid at 30° C., of at least 0.05 dl/g, preferably 0.10 to 5.0 dl/g, more preferably 0.2 to 2.0 dl/g (0.5 wt% polymer solution).

The polymer used in this invention usually has a number average molecular weight in the range of about 500 to about 1,000,000, preferably about 2,000 to about 200,000.

The soluble polymer used in this invention can be easily formed by reacting a polymer (to be referred to as an "intermediate polymer") containing at least 30 mole% of a recurring unit of the formula

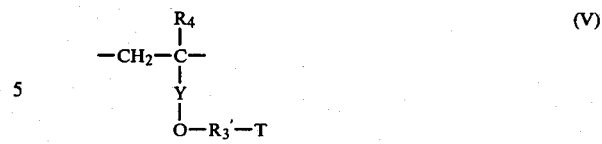

wherein T represents a halogen atom or an epoxy group, $R_3'$ represents an alkylene group containing 1 to 3 carbon atoms which may have a —OH group, and Y and $R_4$ are as defined hereinabove, with an amine of the following formula

wherein $R_1$ and $R_2$ are as defined.

The functional group —$R_3'$—T in the intermediate polymer containing the recurring unit of formula (V) may be introduced into the polymer after its formation. It is convenient generally, however, to prepare the intermediate polymer by using a monomer having such a functional group from the viewpoint of the ease of controlling the content or position of the functional group.

Thus, known polymers can be used as the intermediate polymer containing the recurring unit of formula (V), or such a polymer can be easily produced by known methods.

A first method for preparing the intermediate polymer containing the recurring unit of formula (V) typically comprises subjecting to addition polymerization in a manner known per se at least one of monomers of the following formulae (VI), which will provide the recurring units of formula (I-a), (I-b) or (I-d), itself or with the comonomers described hereinbelow.

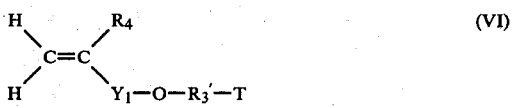

wherein $R_4$ represents a hydrogen atom or a methyl group; T represents a halogen atom or an epoxy group

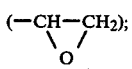

$R_3'$ represents an alkylene group containing 1 to 2 carbon atoms; $Y_1$ represents a direct bond, a methylene group or a carbonyl group (>C=O).

Specific examples of monomers of formulae (VI) are given below.

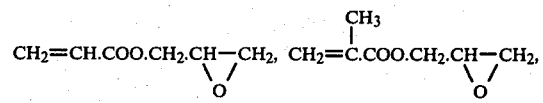

-continued $$CH_2=CH.CH_2.O.CH_2.CH\underset{O}{\overset{}{\underset{\diagdown\diagup}{-}}}CH,$$

$$CH_2=\overset{CH_3}{\underset{|}{C}}.CH_2.O.CH_2.CH\underset{O}{\overset{}{\underset{\diagdown\diagup}{-}}}CH_2,$$

$$CH_2=CH\text{—}\underset{}{\underset{}{\bigcirc}}\text{—}O.CH_2.CH\underset{O}{\overset{}{\underset{\diagdown\diagup}{-}}}CH_2$$

As a second method for preparing the intermedeate polymer containing the recurring units of formula (V), the group —$R_3'$—T can be introduced into the vinylpolymer, which has not the functional group —$R_3'$—T, after the polymerization.

The typical vinylpolymer which can be introduced with the group —$R_3'$—T are the polymer having the recurring units of the formulae (VII) and (VIII).

$$-CH_2-CH- \quad (VII)$$
$$\underset{OH}{\underset{|}{\bigcirc}}$$

$$-CH_2-\underset{OH}{\underset{|}{CH}}- \quad (VIII)$$

The hydroxy group in the recurring units of the formula (VII) or (VIII) is converted to the functional group —$R^3$—T by the reaction with epihalohydrine $$(X-CH_2-CH\underset{O}{\overset{}{\underset{\diagdown\diagup}{-}}}CH_2).$$

When the recurring units of formula (VI), (VII), (VIII) or their precurcer units remains without being converted to the recurring units of formula (I), they are regarded as a co-recurring units.

The other monomer copolymerizable with the vinyl monomer of formulae (VI), (VII) or (VIII) above may be selected from a wide range of radical polymerizable monomers which copolymerize with the vinyl monomer in the presence of a radical initiator to form soluble polymers defined hereinabove.

Such a radical polymerizable comonomer generally includes:

(1) monomers containing up to 2, preferably 1 carbon-carbon ethylenically unsaturated bonds of the vinyl, vinylene, vinylidene or (meth)allyl type (to be referred to as ethylenic comonomers), and (2) monomers not containing such an ethylenically unsaturated bond but copolymerizable with the vinyl monomer of formula (VII) or (VIII) (to be referred to as non-ethylenic comonomers), such as $SO_2$.

They can be used either singly or mixed with each other. The monomers (2) are useful, for instance, as a monomeric component which gives the copolymer with high molecular weight which contains the recurring unit of the formula (I-d).

Suitable ethylenic comonomers of type (1) contain at most 20 carbon atoms, preferably 2 to 15 carbon atoms, more preferably 4 to 10 carbon atoms, and a molecular weight of 28 to 300, especially 50 to 250. Desirably, the ethylenic comonomers generally have a solubility, in water or a lower alcohol such as methanol, ethanol or propanol at 25° C., of at least 0.5 g, preferably at least 1 g, more preferably at least 5 g, per 100 g of such a solvent.

The ethylenic comonomer (1) is preferably selected from the following compounds (a) and (b).

(a) Compounds of the following formula $$\underset{H}{\overset{R_6}{\diagdown}}C=C\underset{R_8}{\overset{R_7}{\diagup}} \quad (III\text{-}1)$$

wherein $R_6$ represents a hydrogen atom or an alkoxycarbonyl group with the alkyl moiety containing 1 to 10 carbon atoms;

$R_7$ represents a hydrogen or halogen atom or a methyl group;

$R_8$ represents a hydrogen or halogen atom, an alkoxy group containing 1 to 10 carbon atoms optionally substituted by a hydroxyl group and/or a halogen atom, an alkoxycarbonyl group with the alkyl moiety containing 1 to 10 carbon atoms, an alkanoyl group containing 1 to 10 carbon atoms, an alkanoyloxy group containing 1 to 10 carbon atoms, an alkyl group containing 1 to 10 carbon atoms substituted by the group —$SO_3M$ or hydroxyl group, a phenyl group optionally substituted by the group —$SO_3M$ or a methyl group, a glycidyloxy group, or a group of the formula -(-B—O-)$_j$H in which B represents an ethylene or propylene group, and j is an integer of 1 to 8;

$R_6$ and $R_7$, together, may represent an ethylenedioxy group; and

M represents an alkali metal.

(b) Compounds of the following formula $$R_9-\underset{\underset{CH_2}{|}}{\overset{\overset{CH_2}{|}}{C}}\underset{\diagdown\diagup}{\overset{}{\underset{J}{}}}\underset{\underset{CH_2}{|}}{\overset{\overset{CH_2}{|}}{C}}-R_{10} \quad (III\text{-}2)$$

wherein $R_9$ and $R_{10}$, independently from each other, represent a hydrogen atom or a methyl group;

J represents an oxygen atom or a group of the formula $$\underset{R_{11}}{\diagdown}\underset{R_{12}}{\overset{\overset{\oplus}{N}\cdots X^{\ominus}}{\diagup}};$$

$R_{11}$ and $R_{12}$, independently from each other, represent a hydrogen atom or an alkyl group containing 1 to 10 carbon atoms; and $X^{\ominus}$ represents an anion such as halogen ions, $HSO_4^{\ominus}$, $NO_3^{\ominus}$, $HCOO^{\ominus}$ and $H_3C.COO^{\ominus}$.

Typical examples of comonomers represented by the above formulae (III-1) and (III-2) are given below.

(1) Aliphatic olefins

CH$_2$=CH$_2$, CH$_2$=CH.CH$_3$, CH$_2$=CH.CH$_2$.CH$_3$,

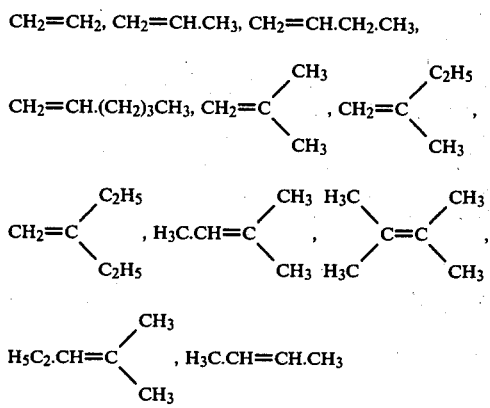

H$_5$C$_2$.CH=C(CH$_3$)$_2$, H$_3$C.CH=CH.CH$_3$ (2) Hetero atom-containing aliphatic olefins

CH$_2$=CH.CN, CH$_2$=C(CH$_3$).CN, CH$_2$=CH.COON,

CH$_2$=CHOCH$_3$, CH$_2$=CHOC$_2$H$_5$, CH$_2$=C(CH$_3$).COOH,

CH$_2$=CHCl, CH$_2$=CHF, CH$_2$=C(Cl)$_2$, CH$_2$=CF$_2$,

CH$_2$=CH.SO$_3$H, CH$_2$=CH.CH$_2$.SO$_3$H, CH$_2$=CH.CH$_2$.SO$_3$Na,

CH$_2$=C(CH$_3$).CH$_2$.SO$_3$Na,

CH$_2$=CH.C(O).N(CH$_3$)$_2$, CH$_2$=CH.C(O).N(C$_2$H$_5$)$_2$,

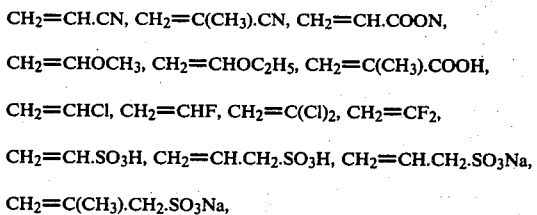

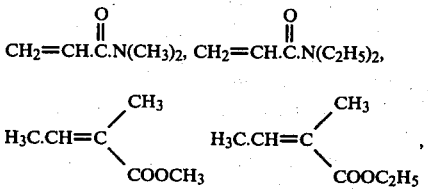

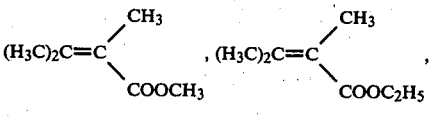

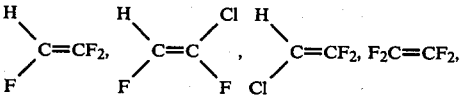

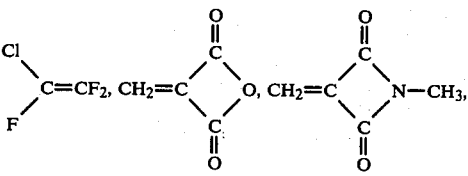

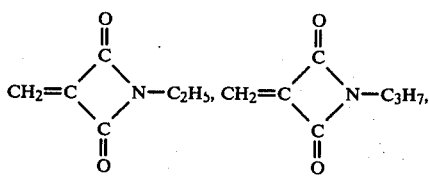

CH$_2$=CH.C(O).N(C$_2$H$_4$OH)$_2$, 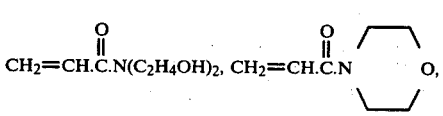

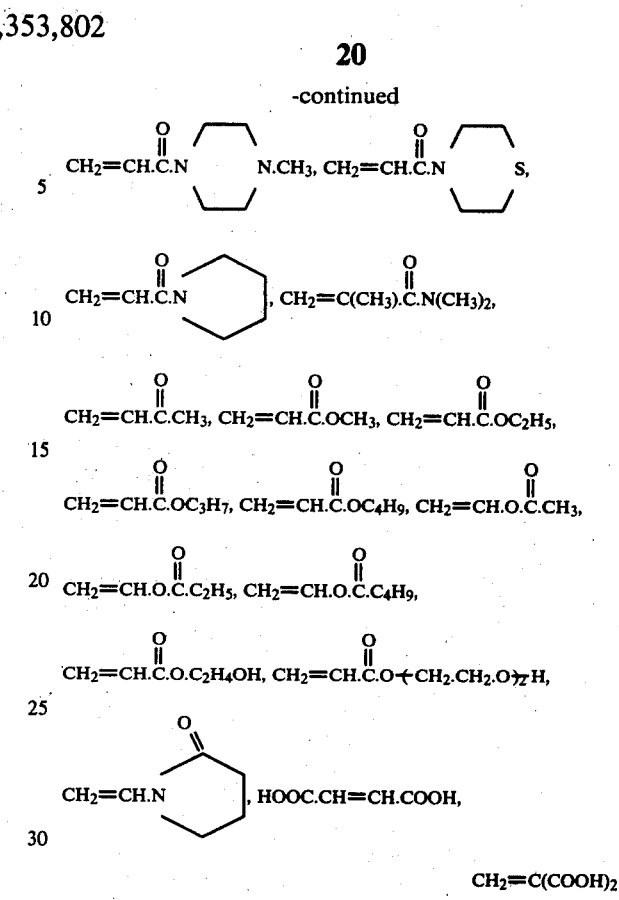

CH$_2$=CH.C(O).CH$_3$, CH$_2$=CH.C(O).OCH$_3$, CH$_2$=CH.C(O).OC$_2$H$_5$,

CH$_2$=CH.C(O).OC$_3$H$_7$, CH$_2$=CH.C(O).OC$_4$H$_9$, CH$_2$=CH.O.C(O).CH$_3$,

CH$_2$=CH.O.C(O).C$_2$H$_5$, CH$_2$=CH.O.C(O).C$_4$H$_9$,

CH$_2$=CH.C(O).O.C$_2$H$_4$OH, CH$_2$=CH.C(O).O(CH$_2$.CH$_2$.O)$_z$H,

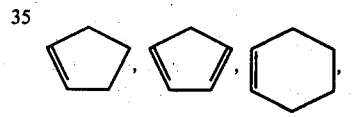, HOOC.CH=CH.COOH,

CH$_2$=C(COOH)$_2$ (3) Alicyclic olefins

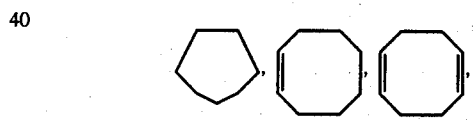

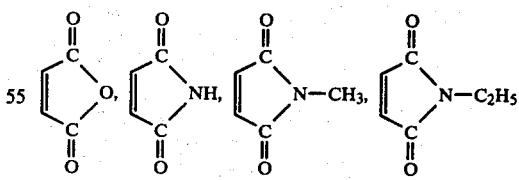

(4) Heterocyclic olefins

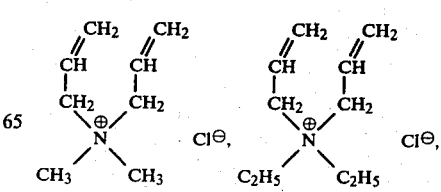

(5) Diallyl compounds

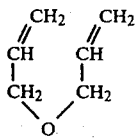

The aforesaid comonomers should be used such that the resulting copolymer should have an active amino group content of at least 0.5 milliequivalent per gram of the copolymer after the amine modifying treatment to be described.

Generally, the proportion of the comonomer is up to 70 mole%, preferably 10 to 50 mole%.

Among the comonomers (1) to (5) above, maleic anhydride, methyl acrylate, methyl methacrylate, ethyl acrylate, ethyl methacrylate, 2-hydroxyethyl acrylate, methylvinyl ether, ethylvinyl ether and styrene are preferred as comonomers to be copolymerized.

The intermediate polymer prepared in the above manner is then converted to a soluble polymer containing the recurring unit of formula (I) by treating it together with the amine of formula (II).

The amine compound of formula (II) is reacted with the intermediate polymer to impart moderate hydrophilicity and solubility to the polymer, and also provides a crosslinking site for a crosslinking reaction to be described hereinbelow.

The use of an amino compound having too high a molecular weight tends to cause gellation in the amine modification of the aforesaid intermediate polymer.

Furthermore, if the number of amino groups is too large, many unreacted amino groups will remain in the cross-linked polymer formed by the crosslinking reaction to be described hereinbelow. This undesirably causes a reduction in the oxidation resistance of the polymer.

Preferably, such an amine modification reaction is carried out as quantitatively as possible so long as gellation owing to an intermolecular reaction does not take place.

One example of the amine modifying reaction of the intermediate polymer is schematically shown as follows:

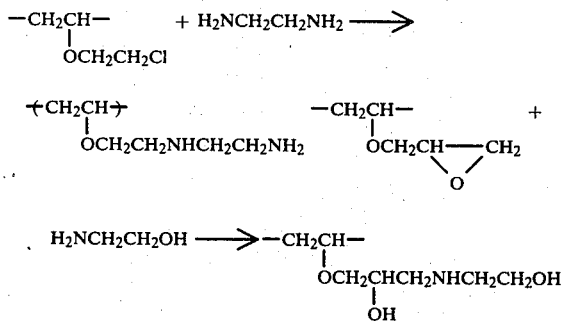

To avoid gellation in this amine modifying reaction, it is preferable to carry out the reaction in a dilute solution of the amino compound. Usually, by adding the intermediate polymer to an amine solution having a concentration of 1 to 20% by weight, preferably 5 to 10% by weight, and carrying out the reaction at a relatively mild temperature range, preferably at room temperature to 150° C., more preferably 50° C. to 120° C., the amine modification is achieved without involving gellation.

The reaction solvent for the amine modification reaction may be any solvent which does not easily react with the intermediate polymer to be modified with the amine, and the amine compound. In view of the solubilities of the starting material and the product, and the ease of post-treatment, suitable solvents are water, ethers such as tetrahydrofuran and dioxane, alcohols such as methanol, ethanol and propanol, and aromatic hydrocarbons such as benzene and toluene. Water, methanol, and ethanol are preferred, and water is most preferred.

The amount of the amino compound used in the amine modifying reaction is not critical, and can vary as desired, according to its type, etc. Generally, the suitable amount of the amino compound is 0.5 to 1.5 moles, especially 0.8 to 1.2 moles, per equivalent of the reactive groups ($-R_3'-T$) contained in the intermediate polymer. If the amount of the amino compound is less than 0.5 mole per equivalent of the reactive groups in the intermediate polymer, gellation will occur during the amine modifying reaction, or a semipermeable membrane obtained after the crosslinking reaction to be described hereinbelow will tend to have a reduced water flux. On the other hand, when the amount of the amino compound exceeds 1.5 moles per equivalent of the reactive groups, the unreacted amino compound will undesirably cause a reduction in the strength and salt rejection of a semipermeable membrane obtained after the crosslinking reaction.

The amine-modified amino-containing soluble polymer is used for the formation of a membrane either as such or after diluting the reaction mixture, or after isolating and purifying the reaction mixture.

Thus, suitable base polymers used to make the semipermeable membrane in accordance with this invention include not only (I) polymers composed substantially only of the recurring units of formula (I), but also (II) copolymers described below.

Suitable copolymers for use in this invention are composed of (A) at least 30 mole%, preferably at least 50 mole%, more preferably at least 70 mole%, of the recurring unit of formula (I-a), (I-b), (I-c), (I-d) or (I-e), and (B) up to 70 mole%, preferably up to 50 mole%, more preferably up to 30 mole%, of at least one recurring unit selected from those of the following formulae (IV-1) and (IV-2);

$$\begin{array}{cc} R_{13} & R_{14} \\ | & | \\ -C-\!\!\!\!-C- \\ | & | \\ H & R_{15} \end{array} \qquad (IV\text{-}1)$$

wherein
$R_{13}$ represents a hydrogen atom or an alkoxycarbonyl group with the alkyl moiety containing 1 to 10 carbon atoms;
$R_{14}$ represents a hydrogen or halogen atom or a methyl group;
$R_{15}$ represents a hydrogen, halogen atom, an alkoxy group containing 1 to 10 carbon atoms optionally mono- or di-substituted by a hydroxyl group and/or a halogen atom, an alkoxycarbonyl group with the alkyl moiety containing 1 to 10 carbon atoms, an alkanoyl group containing 1 to 10 carbon atoms, an alkanoyloxy group containing 1 to 10 carbon atoms, an alkyl group containing 1 to 10 carbon atoms mono-substituted by the group —SO₃M or a hydroxyl group, a phenyl group optionally mono-substituted by the group —SO₃M or a methyl group, a glycidyloxy group, a group of the formula ―(B―O)ⱼH in which B represents an ethylene or propylene group and j is an integer of 1 to 8;

R₁₄ and R₁₅ together may represent

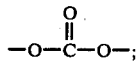

and M represents an alkali metal;

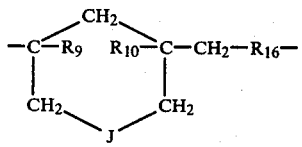
(IV-2)

wherein R₉, R₁₀ and J are as defined with regard to formula (III-2), and R₁₆ represents a direct bond or —SO₂—.

Typical examples of especially suitable soluble polymers containing the recurring units of formula (I) are given below. These examples are for the purpose of facilitating the understanding of the invention, and are in no way intended to limit the scope of this invention.

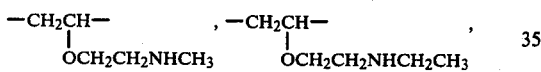

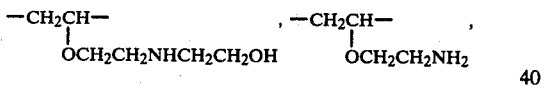

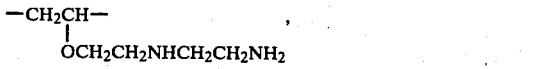

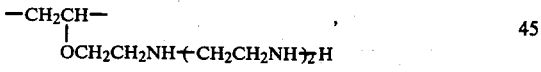

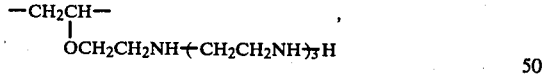

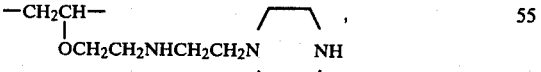

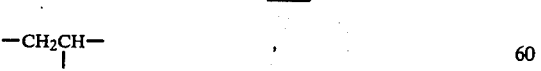

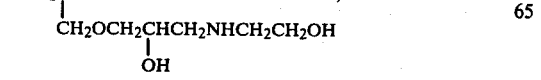

-continued

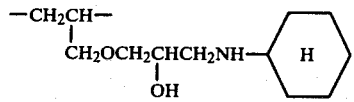

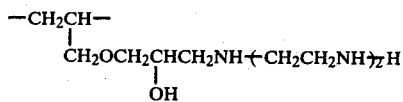

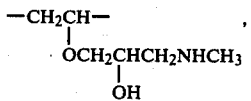

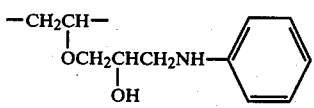

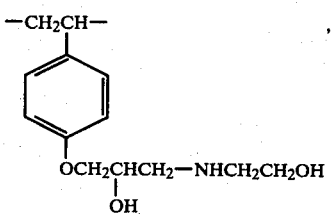

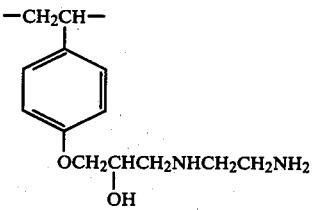

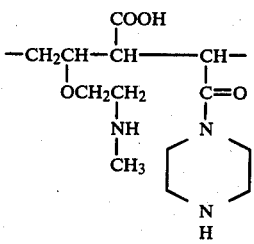

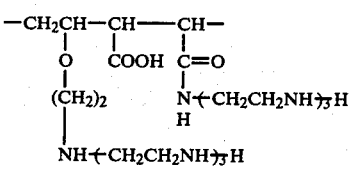

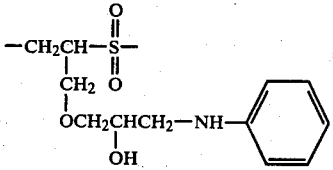

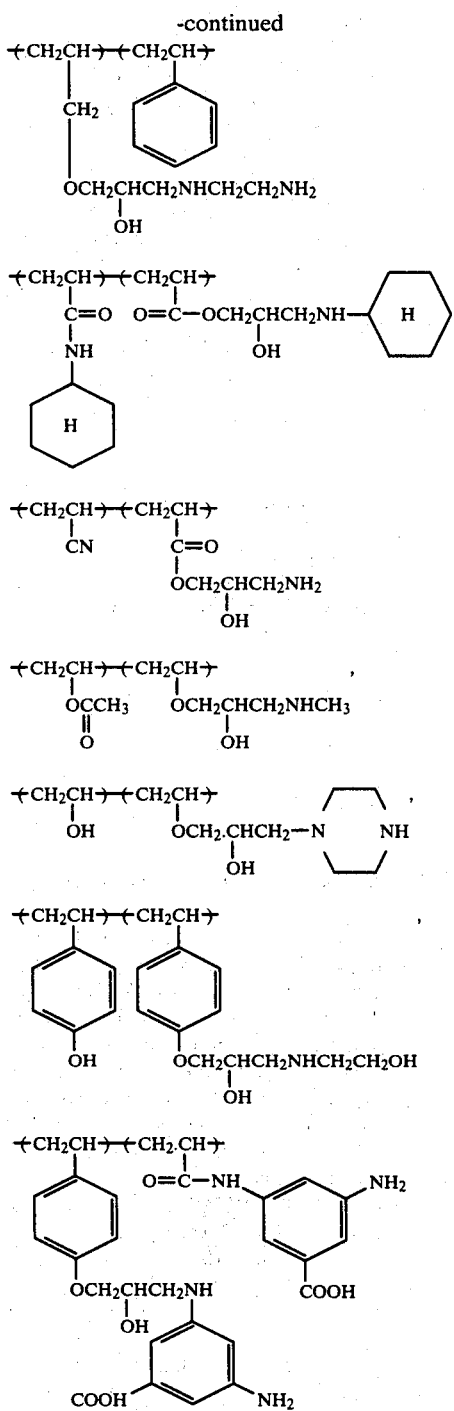

The aforesaid polymers can be used singly, or as a mixture with each other.

So long as the objects of this invention can be achieved, the polymer having the unit of formula (I) can be used as a blend with another polymer. Such other polymer includes those which have the ability to form a water-soluble or aqueous emulsion, and form a polymeric alloy as a whole after blending with the polymer having the unit of formula (I) and the crosslinking of the polymer having the unit (I), and which even when the water-soluble polymer is not crosslinked, can by themselves become substantially insoluble. The proportion of such a polymer varies according to the proportion of the structural unit of formula (I) in the above polymer. It should, however, be such that in the resulting blend, the proportion of the structural unit of formula (I) is at least 50 mole%. If the proportion of the other polymer is too high, it is difficult to form a polymeric alloy. Hence, the other polymer is blended usually in an amount of not more than 30 parts by weight, preferably not more than 10 parts by weight, per 100 parts by weight of the polymer having the unit (I).

Use of such a polymer blend makes it possible also to control the flexibility and hydrophilicity of the resulting composite membrane.

Examples of the other polymer having the aforesaid properties include polyvinyl alcohol, polyvinyl pyrrolidone, poly(sodium acrylate), poly(sodium methacrylate), polyvinyl methyl ether, polyvinyl ethyl ether, a copolymer of methyl vinyl ether and maleic anhydride, a copolymer of vinyl acetate and ethylene, polyvinyl acetate and partially hydrolyzed products of these polymers.

To produce the semipermeable composite membrane of the invention from the polymer containing the recurring unit of formula (I), it is necessary to crosslink the polymer while it is deposited on at least one side of a microporous substrate.

Deposition of the polymer on the microporous substrate can be effected by applying a solution of the base polymer containing the recurring unit of formula (I) to the substrate.

The solvent for the preparation of the solution of the base polymer may be those which do not substantially dissolve or swell a substrate to which the solution is applied. Specific examples include water, lower alcohols, acetone, tetrahydrofuran, dimethylsulfoxide, N-methylpyrrolidone, dimethylformamide, dimethylacetamide and a mixture of at least two of these compounds. Of these, water and aqueous mixtures of these consisting mainly of water are preferred.

The concentration of the base polymer in the solvent is not critical, and can be varied widely depending upon the type and viscosity of the polymer, etc. Generally, it is advantageous to use the polymer in a concentration of at least 0.05% by weight, preferably 0.07 to 10% by weight, more preferably 0.1 to 5% by weight, based on the weight of the solution.

The base polymer is deposited in the form of thin film on the microporous substrate before crosslinking. This deposition can be performed in quite the same manner, as a conventional method disclosed, for example, in the above-cited U.S. patents. For example, the thin film can be formed in situ upon the microporous substrate or it can be formed separately, as by a floatation-deposition method.

Substrates that can be used may be any of the types conventionally used in a reverse osmosis process. They include porous glass, sintered metals, ceramics, and organic polymeric materials such as cellulose esters, styrene resins, vinyl butyral resins, polysulfone, chlorinated polyvinyl chloride, etc. described in U.S. Pat. No. 3,676,203. Polysulfone film has been found to be a particularly effective support material for the membranes of the invention, and chlorinated polyvinyl chloride is another very effective support material. Preparation of polysulfone microporous substrate is described in Office of Saline Water Research and Development Progress Report No. 359, Oct., 1968.

These substrates preferably have a surface pore size of generally 100 to 1000 Å, but are not limited to these specific sizes. Depending upon the use of the final membrane product, surface pores ranging in size from about 50 Å to about 5000 Å may be acceptable.

The substrate may be of an isotropic structure or an anisotropic structure, desirably of the latter structure. When the membrane constant of the substrate is less than $10^{-4}$ g/cm$^2$.sec.atm, the water permeability of the substrate is too low, and when it is more than 1 g/cm$^2$.sec.atm, the salt rejection tends to be extremely low. Accordingly, preferred membrane constants are 1 to $10^{-4}$ g/cm$^2$.sec.atm, and the best results are obtained with a membrane constant of $10^{-1}$ to $10^{-3}$ g/cm$^2$.sec.atm. The term "membrane constant", as used herein, denotes the amount of pure water which permeates the membrane under a pressure of 2 kg/cm$^2$, and is expressed in g/cm$^2$.sec.atm.

Preferably, the substrate used is reinforced at its back with a woven or non-woven cloth, etc. Examples of the woven or non-woven cloth are those of polyethylene terephthalate, polystyrene, polypropylene, nylon or vinyl chloride resins.

When it is desired to form a thin film of the base polymer in situ on the microporous substrate, the microporous substrate is treated with a solution of the base polymer. The treatment can be performed by coating at least one surface of the substrate with a solution of the base polymer by a suitable method such as solution casting, brush coating, spraying, wig coating or roll coating; or by immersing the substrate in a solution of the base polymer.

The substrate so treated by coating or immersion is then subjected to a drain treatment. The drain treatment can be carried out generally at room temperature for 1 to 30 minutes, preferably 5 to 20 minutes. As a result, a substrate is obtained which has formed thereon a thin layer of the polymer solution with a suitable thickness that can vary according to the concentration of the polymer in the polymer solution. Usually, a thin film material of the base polymer having a total thickness of about 1,000 to about 50,000 Å, preferably about 2,000 to about 10,000 Å, is deposited on the surface of the substrate.

The substrate on which the base polymer has been deposited can be directly subjected to a crosslinking treatment.

The substrate having the thin film deposited on the support is then subjected to a crosslinking treatment by using a polyfunctional compound containing at least two functional groups capable of reacting with the active amino group to crosslink the thin film material of the base polymer on the substrate.

The crosslinking reaction is effected by an interfacial reaction between the surface of the film material of the base polymer and the polyfunctional compound to produce a thin film having permselectivity on the surface of the substrate. Since the main purpose of the polyfunctional compound is to provide an interfacial reaction substantially concentrated on or confined to the surface of the film of the base polymer, the polyfunctional compounds should be preferably selected in accordance with the principles of interfacial reaction. For example, when the base polymer film is coated from an aqueous solution, the polyfunctional compound or polyfunctional compound solution should be substantially insoluble in water. For this and other reasons, various polyfunctional compounds compatible with non-polar organic solvents such as hydrocarbons but substantially insoluble in water are preferred. Selection of the polyfunctional compounds is also governed by empirical conditions, e.g. the salt rejection and flux properties or resistance to compaction of the ultimately obtained membrane.

The functional groups of the polyfunctional compounds that can be used in this invention are either one of acid halide groups (—COX), sulfonyl halide groups (—SO$_2$X), N-haloformyl groups (>N—COX), haloformate groups (—OCOX), isocyanate groups (—NCO) and acid anhydride groups

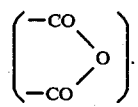

At least two, preferably 2 or 3, of these functional groups can be contained per molecule.

In addition to compounds having such functional groups, cyanuric acid chloride of the following formula

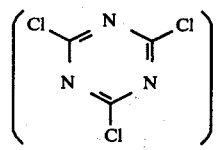

can also be used in this invention as the polyfunctional compounds.

Preferred functional groups are acid halide, sulfonyl halide and acid anhydride groups, the first two being especially preferred. Another suitable functional group is an isocyanate group. Two or more functional groups present in one molecule may be of the same type or of different types. The polyfunctional compounds generally have a cyclic structure, and may be aromatic, heterocyclic or alicyclic. For the purpose of the present invention, aromatic polyfunctional compounds have been found to be especially effective.

Any mononuclear or polynuclear (especially, binuclear) aromatic polyfunctional compounds having at least two, preferably two or three, functional groups bonded to the aromatic ring and 6 to 20, preferably 6 to 15, carbon atoms can be suitably used in the present invention. Preferably, the aromatic ring or rings should not contain a substituent other than the above functional groups. However, one or two groups which do not substantially affect the crosslinking reaction, such as lower alkyl groups, lower alkoxy groups or halogen atoms, may be present on the aromatic ring.

An especially desirable group of the aromatic polyfunctional compounds includes those of the following formula

wherein Ar represents a benzene ring, a naphthalene ring, or the ring

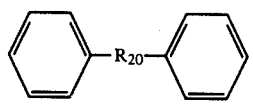

in which $R_{20}$ represents —CH$_2$—,

—O—, SO$_2$— or —CO—; $R_{17}$, $R_{18}$ and $R_{19}$, independently from each other, represent an acid halide, sulfonyl halide, isocyanate, N-haloformyl or haloformate group, especially the first three groups; or $R_{17}$ and $R_{18}$ together represent an acid anhydride group; it is especially desirable that $R_{17}$, $R_{18}$ and $R_{19}$ be selected from acid halide and sulfonyl halide groups. Typical examples of the aromatic polyfunctional groups are shown below.

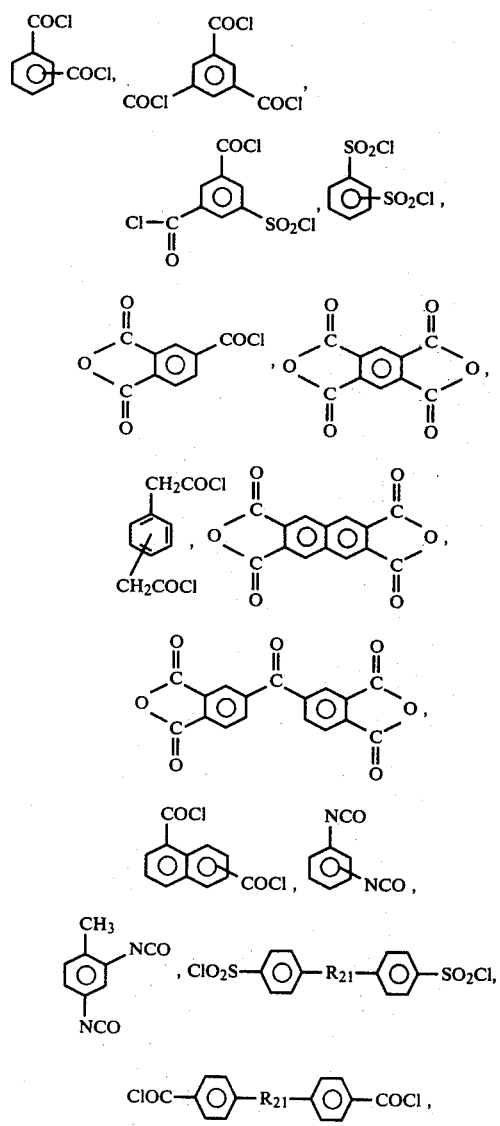

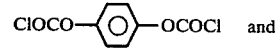

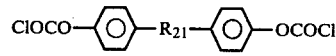

($R_{21}$ represents a direct bonding, —O—, —CH$_2$—,

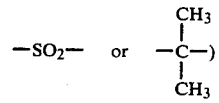

Especially advantageous aromatic polyfunctional compounds are isophthaloyl chloride, terephthaloyl chloride, trimesoyl chloride and 3-chlorosulfonylisophthaloyl chloride.

Preferred heterocyclic polyfunctional compounds that can be used in this invention are 5- or 6-membered heteroaromatic or heteroalicyclic compounds having two or three functional groups bonded to the heterocyclic ring and containing 1 to 2 nitrogen, oxygen or sulfur atoms as heteroatoms. Examples are as follows:

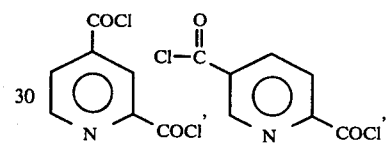

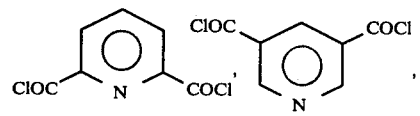

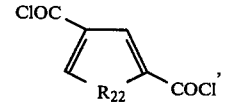

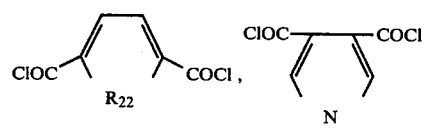

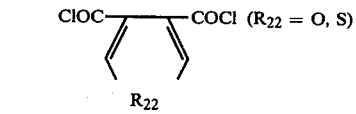

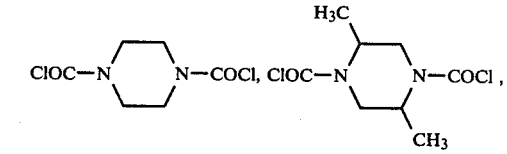

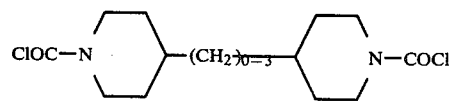

Preferred cyclic polyfunctional compounds that can be used are those having 2 or 3 functional groups bonded to the alicyclic ring and containing 5 to 20, preferably 6 to 15, carbon atoms. Examples are as follows:

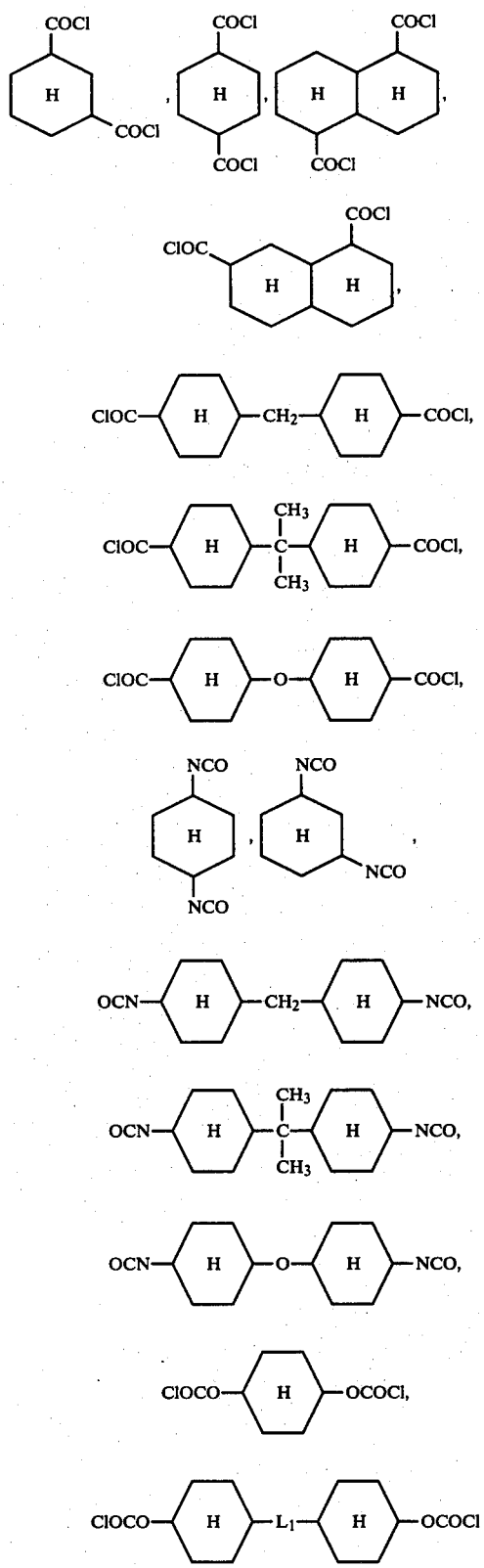

(L₁ represents a direct bonding,

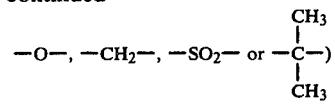

—O—, —CH₂—, —SO₂— or —C(CH₃)(CH₃)—)

Preferred aliphatic polyfunctional compounds that can be used are those having 2 functional groups and containing 5 to 20, preferably 6 to 15, carbon atoms. Examples are as follows:

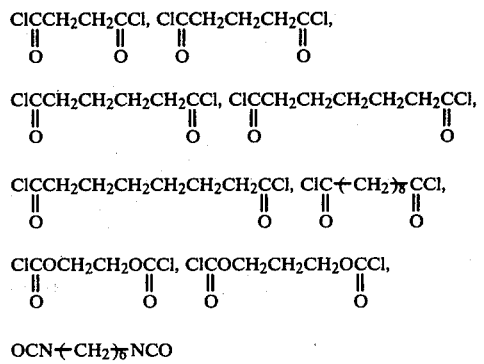

OCN(CH₂)₆NCO

The aromatic heterocyclic or alicyclic polyfunctional compounds can be used either alone or as a mixture of two or more.

It has been found that the salt rejection and/or flux properties of the finally obtained membrane can be improved by using trifunctional compounds rather than difunctional ones when they are used singly, and by using a combination of a difunctional compound and a trifunctional compound when they are used in combination. Thus, especially preferred polyfunctional compounds to be used in the present invention are trifunctional aromatic compounds; and mixtures of difunctional aromatic compounds and trifunctional aromatic compounds. When a mixture of a difunctional compound and a trifunctional compound is used, the mixing ratio between them is not critical. Generally, the weight ratio of the difunctional compound to the trifunctional compound is from 10:1 to 1:3, preferably from 5:1 to 1:1.

The crosslinking of the film material of the base polymer can be performed usually by contacting the film with a solution of the polyfunctional compound. The solvent used to dissolve the polyfunctional compound should not substantially dissolve the base polymer and the substrate material, and includes hydrocarbons such as n-hexane, n-heptane, n-octane, cyclohexane, n-nonane and n-decane. The optimal concentration of the polyfunctional compound in the solvent may vary considerably depending upon the specific compound, solvent, substrate, etc., and is best determined experimentally. However, concentration of about 0.5 to 5.0, preferably about 1.0 to 3.0% by weight are generally satisfactory.

Conveniently, the crosslinking is accomplished on the interface between the film and the solution by immersing the film in the solution of the polyfunctional compound. In order to promote this crosslinking reaction, it is possible to include a crosslinking accelerator into the film of the base polymer. This accelerator serves to help the polyfunctional compound diffuse into the polymer, and/or to capture hydrogen halide released at the time of crosslinking reaction. Such an accelerator may include, for example, soluble basic compounds and surface-active agents.

Advantageously, suitable soluble basic compounds have a solubility in water or a lower alcohol such as methanol, ethanol or propanol or a mixture thereof of at least 0.1 g, preferably at least 0.2 g, more preferably at least 0.5 g, per 100 g of water, the lower alcohol or a mixture thereof at 25° C. As such compounds, inorganic basic compounds and organic basic compounds having the above solubility can be monitored. Any inorganic basic compounds having the above-mentioned solubility can be used. The organic basic compounds should desirably have a pka value of generally 5 to 12, preferably 8 to 12.

Examples of the soluble basic compounds are (1) inorganic bases such as sodium hydroxide, potassium hydroxide, lithium hydroxide, sodium carbonate, lithium carbonate, potassium carbonate, sodium bicarbonate, potassium bicarbonate, lithium bicarbonate, sodium phosphate (Na3PO4) and potassium phosphate (K3PO4); and (2) organic bases such as triethylamine, trimethylamine, diazabicyclo[2,2,2]octane, hexamethylenetetramine, ethylenediamine, triethylenetetramine, methylamine, ethylamine, triethanolamine, diethanolamine, pyridine, N,N-dimethylaniline, N-methylpiperidine, and N-methylpyrrolidine.

These basic compounds capture hydrogen halide, which may be formed by the crosslinking reaction to promote the crosslinking reaction, positively participate in the crosslinking reaction itself, and also have the effect of improving the mechanical strength or oxidation resistance of the resulting semipermeable membrane. They are especially suitable as crosslinking accelerators.

The basic compound is used in an amount of generally 0.5 to 2.0 moles, preferably 0.7 to 1.2 moles, per equivalent of the active amino group in the polymer.

The interfacial crosslinking reaction between the surface of the film and the polyfunctional agent can be carried out at about −10° C. to about 100° C., preferably 20° C. to 50° C., for a period of 10 seconds to 30 minutes, preferably 30 seconds to 10 minutes. This interfacial reaction can be performed so that it is concentrated largely on the surface of the film, and it is not necessary to reduce the water content of the internal regions of the film.

Then, the film supported on the substrate is optionally subjected to a drain treatment to drain the excess of the polyfunctional compound solution of 10 seconds to 2 minutes, and then heat treated at a temperature of 70° to 150° C., preferably 90° to 130° C. This can complete the crosslinking reaction and achieve the insolubilization of the film of the base polymer.

Crosslinking agents which tend to exist as gases at room temperature, for example oxalyl dichloride or phosgene, can be contacted in the gaseous state with the aforesaid membrane to induce a crosslinking reaction.

The possible structure of the polymer of this invention crosslinked in the above manner along with the amino modification and crosslinking reaction is shown by the following three examples.

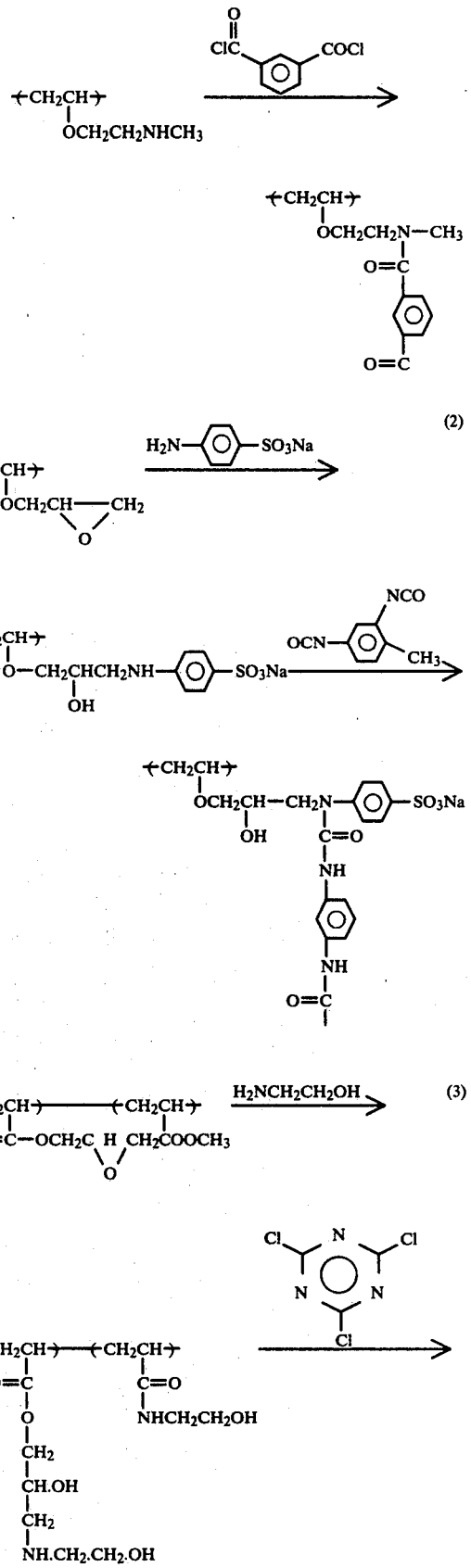

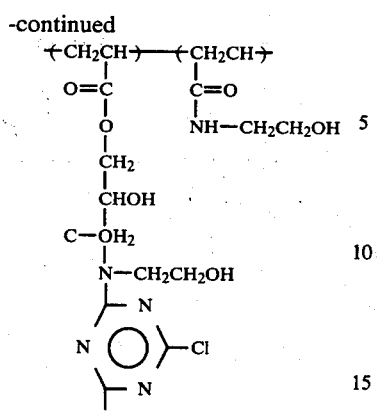

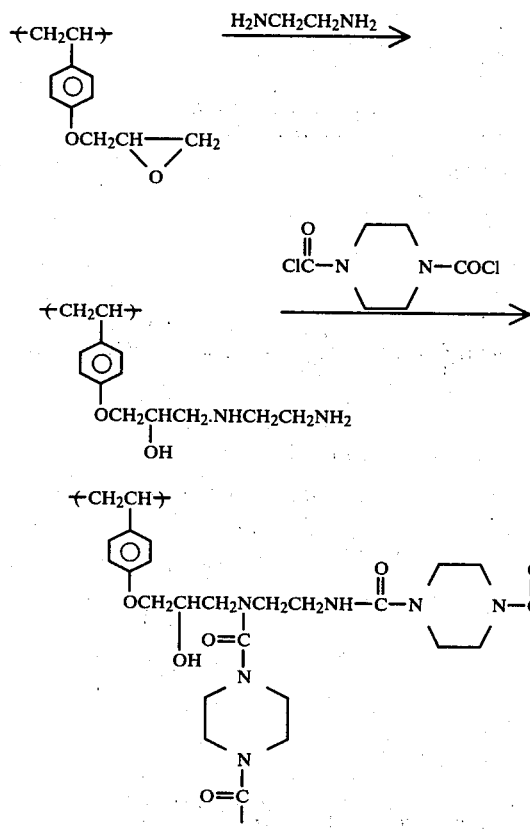

Thus, according to this invention, there is provided a semipermeable composite membrane comprising a microporous substrate and a semipermeable thin film of the type described hereinabove formed on one surface of the microporous substrate. In the composite membrane, the thickness of the semipermeable thin film is not strictly set, and it may have a total thickness of at least 100 Å, usually 1,000 to 4,000 Å.

The composite membrane obtained by this invention can be used in various modules, but a spiral module is most preferred. When the composite membrane of this invention is fabricated into a spiral module, it is preferable to cover the surface of the composite membrane with a film of a water-soluble polymer in order to protect the surface.

Thus, it is also within the scope of this invention to provide a protective coating on the surface of the composite membrane of the invention. Deposition of the protective coating on the thin film is carried out by coating the barrier film with a water-soluble organic polymer such as polyvinyl alcohol, polyvinyl pyrrolidone polyacrylamide, polyacrylic acid, polyvinyl methyl ether, and polyvinyl ethyl ether. Polyvinyl alcohol, polyvinyl pyrrolidone and polyvinyl methyl ether are preferred. The polymer is used as a 1–20 wt%, preferably 6–10wt.%, aqueous solution. In a specific embodiment, the dried semipermeable composite membrane is passed through a solution of the water-soluble organic polymer or coating the polymer solution on the surface of this barrier film by known means such as dip coating, spraying, or brush coating to coat the film continuously with the solution of the water-soluble organic polymer; then the water is removed; and to form a final product, the coated semipermeable composite membrane is dried at a temperature of about 50° to 150° C., preferably about 90° to 130° C. for about 5 to 10 minutes.

The membrane having semipermeability provided by this invention is very suitable as a semipermeable membrane for the applications to be described because it has superior salt rejection, flux properties, dry-wet-reversibility, superior flexibility, high resistance to compaction, high resistance to chemical and/or biological degradation, especially flexibility and dry-wet-reversibility.

The membrane of this invention can be advantageously used as a semipermeable membrane to separate and remove tiny amounts of contaminated molecules dispersed or dissolved in a liquid or gas, and can find extensive application, for example in the desalting of sea water and brackish water, and the treatment of industrial effluents containing organic matter, liquids containing mixtures of organic substances, and waste waters from the food industry.

The membrane of this invention can be used especially advantageously as a reverse osmosis membrane in the method for desalination of saline or brackish water by reverse osmosis which comprises contacting the saline or brackish water under pressure with the reverse osmosis membrane. This method is known, and a specific procedure described, for example, in Ind. Eng. Chem. Found. 3, 206 (1964) can be used. Thus, the disclosure of this literature reference is incorporated herein by reference.

The following Examples illustrate the present invention more specifically. The reverse osmosis test carried out in these examples followed the procedure described below.

Reverse Osmosis Testing Method

Reverse osmosis was carried out in an ordinary continuous pump-type reverse osmosis device using a 5000 ppm aqueous solution of sodium chloride at a pH of 7.0 and a temperature of 25° C. The operating pressure was 42.5 kg/cm$^2$.G.

Salt Rejection

The salt rejection (%) is a value calculated from the following equation.

$$\text{Salt rejection (\%)} = \left(1 - \frac{\text{NaCl concentration in permeating water}}{\text{NaCl concentration in the test solution}}\right) \times 100$$

REFERENCIAL EXAMPLE 1

Preparation of a fabric-reinforced microporous substrate:

A Dacron non-woven fabric (basis weight 180 g/m²) was fixed on a glass plate. Then, a solution containing 12.5% by weight of polysulfone, 12.5% by weight of methyl Cellosolve and the remainder being dimethyl formamide was cast onto the fabric in a layer having a thickness of about 200 microns. Immediately, the polysulfone layer was gelled in a room temperature water bath to form a non-woven fabric-reinforced microporous polysulfone membrane.

The resulting microporous polysulfone layer had a thickness of about 40 to 70 microns and had an anisotropic structure. By observation with an electron micrograph, the surface of the microporous layer was found to contain numerous micropores with a size of 50 to 600 Å.

The resulting microporous substrate had a pure water flux (membrane constant) of about 3.0 to $7.0 \times 10^{-2}$ g/cm²·sec·atm.

EXAMPLE 1

10 g of poly(2-chloroethyl vinyl ether) with an inherent viscosity of 0.59 dl/g (measured in N-methylpyrrolidone at 30° C. and 0.5% by weight) prepared by a cation polymerization of 2-chloroethyl vinyl ether in a dry toluene was dissolved in 300 ml of dimethyl formamide.

To this solution was added 10 g of triethylenetetramine together with 10 g of sodium carbonate ($Na_2CO_3$) to cause an amine-modification reaction of the polymer at 130° C. for 30 hours.

The reaction mixture was purified by dialysis using a cellophane semi-permeable membrane to give the amine-modified polymer of the following structural unit with an amine equivalent of 21.2 milliequivalent per gram of the dried polymer.

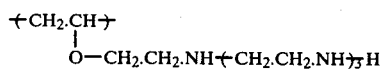

0.3 g of sodium bicarbonate was dissolved in 100 ml of aqueous solution of 1.0% by weight of the polymer.

The polysulfone microporous substrate membrane obtained in Referential Example 1 was dipped for 5 minutes in the aqueous solution, withdrawn from it after a lapse of the 5-minute period, and drained for 10 minutes while it was caused to stand perpendicularly for air-drying.

The resulting uncrosslinked composite membrane was dipped for 5 minutes in a 1% by weight of n-hexane solution of isophthaloyl chloride.

Then, the n-hexane adhering on the surface of the membrane was volatized for 1 minute and the membrane was heat-treated at 100° C. for 10 minutes in a hot air oven to obtain a crosslinked composite membrane.

This membrane was subjected to a reverse osmosis test (RO test) employing a continuous loop type high pressure pump with flow-through cells using 0.5% by weight of sodium chloride aqueous solution at an applied pressure of 600 psi at 25° C.

One hour later, the membrane showed a water flux of 65.3 liters/m²·hr and a salt rejection of 93.8%.

The RO test was continued for the subsequent 100 hours, at which point the membrane gave a water flux of 59.7 liters/m²·hr and a salt rejection of 95.6% indicating an excellent resistance to pressure compaction.

EXAMPLE 2

A composite membrane was prepared in accordance with the method described in Example-1 except that tolune-2,4-diisocyanate was used instead of isophthaloyl chloride as a crosslinking agent.

The initial reverse osmosis performance of this membrane was 73.8 liters/m²·hr and 94.5%.

EXAMPLE 3

A composite membrane was produced according to the same procedure as in Example-1 except that trimesoyl chloride

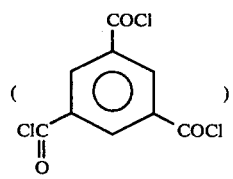

was used instead of isophthaloyl chloride as a crosslinking agent.

This membrane showed a water flux of 98.4 liters/m²·hr and a salt rejection of 90.4%.

EXAMPLE 4

Equimolar ratio of 2-chloroethyl vinyl ether and methyl vinyl ether was co-polymerized in the presence of cationic initiator [$BF_3 \cdot (OC_2H_5)_2$] in a dry methylene dichloride at $-70°$ C. to give a 1:1 copolymer.

This polymer was subjected to an amine-modification using triethylene tetramine to afford the amine-modified polymer of the following structure.

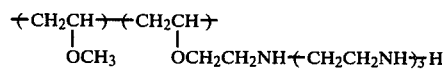

Using this polymer a composite membrane was fabricated by the same procedure as in Example-1.

The membrane thus produced showed a water flux of 70.4 liters/m²·hr and a salt rejection of 92.7%.

EXAMPLE 5

Equimolar ratio of 2-chloroethyl vinyl ether and maleic anhydride was dissolved in a dry benzene. To this solution was added a catalytic amount of azobisisobutyronitrile to initiate the copolymerization at room temperature. The polymer precipitated from the solution was separated and washed with a dry benzene followed by an evaporation in vacuo to driness.

This polymer was proved to be a 1:1 alterating copolymer of 2-chloroethyl vinyl ether and maleic anhydride.

The polymer was subjected to a modification reaction with para-carboxy aniline at a temperature between 130° C. to 140° C. for 30 hours to give the polymer of the following structural unit.

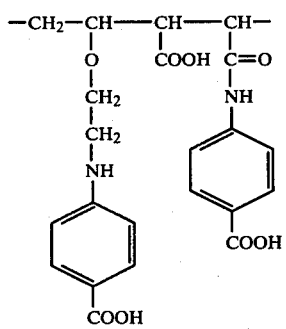

From this polymer, a composite membrane was prepared according to the Example 1 by interfacially crosslinking with toluene dissocyanate on a polysulfone microporous substrate and gave an water flux of 83.8 l/m²·hr and a salt rejection of 93.5%.

EXAMPLE 6 AND COMPARATIVE EXAMPLES 1 AND 2

Composite membranes obtained in Examples 1 to 5 were air-dried for 15 hours after having been subjected to a RO test.

These dried membranes were again subjected to the RO test to examine a dry-wet-reversibility.

The results were shown in Table-I together with those of comparative examples.

TABLE I

| Membrane No. | Initial, RO Performance | | After Drying Test | |
|---|---|---|---|---|
| | W.F.(1/m².hr) | S.R.(%) | W.F.(1/m².hr) | S.R.(%) |
| Ex. 1 | 65.3 | 93.8 | 55.6 | 94.1 |
| 2 | 73.8 | 94.5 | 67.2 | 94.4 |
| 3 | 98.4 | 90.4 | 96.4 | 91.1 |
| 4 | 70.4 | 92.7 | 68.3 | 92.8 |
| 5 | 83.8 | 93.5 | 76.3 | 93.3 |
| Comp. Ex. 1*¹ | 33.5 | 99.3 | 29.7 | 91.3 |
| Comp. Ex. 2*² | 41.2 | 99.1 | 39.5 | 93.7 |

*¹ethylene diamine modified poly(epichlorohydrin) of molecular weight 20,000 crosslinked with isophthaloyl chloride on a microporous polysulfone substrate.
*²polyethylene imine (Nihon Shokubai Co. Ltd., Molecular weight 2,000) crosslinked with isophthaloyl chloride or a microporous polysulfone substrate.

EXAMPLES 7, 8 AND COMPARATIVE EXAMPLE 3

Composite membranes were prepared by the same procedure as in Example 1 except that mono-ethanolamine was used instead of triethylene tetramine and a crosslinking agent indicated in Table-2 was used instead of isophthaloyl chloride.

The membranes were subjected to a reverse osmosis (RO) test. The properties of the membranes after one hour (to be referred to as initial performance) and chlorine resistance of these membranes were measured together with a comparative sample.

TABLE 2

| Ex. No. | Crosslinking Agent | Initial Performance | | After 50 hours*¹ | |
|---|---|---|---|---|---|
| | | W.F. (1/m².hr) | S.R. (%) | W.F. (1/m².hr) | S.R. (%) |
| 7 | Cl-CO-C₆H₄-COCl | 48.1 | 94.5 | 43.7 | 94.9 |
| 8 | cyanuric chloride (tri-Cl triazine) | 31.7 | 97.2 | 28.9 | 98.0 |
| Comp. Ex. 3*² | ClC(O)-C₆H₄-COCl | 39.8 | 99.3 | 51.9 | 83.1 |

*¹: NaOCl (5ppm) added at pH 6.5 in the feed solution after a measurement of initial performance. The concentration of active chlorine and pH level adjusted continually during the RO test.
*²: a composite membrane similarly prepared as the comparative example-1 in Table 1.

EXAMPLES 9 TO 12

4.4 g of polyvinyl alcohol (degree of polymerization, 2000, Wako Chemicals Inc.) and 4.1 g of NaOH were dissolved in 100 ml of distilled water at 70° to 80° C.

To this solution, 9.2 g of epichlorohydrin dissolved in 50 ml of tetrahydrofuran was added and the mixture was heated at 50° to 60° C. for 6 hours.

The reaction mixture was vacuum-evaporated to remove unreacted epichlorohydrin and tetrahydrofuran (solvent), and then 50 ml of aqueous solution of methylamine (30 wt%) was added and stirred for 3 hours at room temperature to give 3.9 g of amine-modified polymer with the following structural unit with an amine equivalent of 6.2 milliequivalent per gram of the dried polymer.

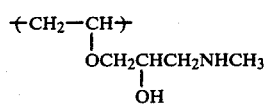

One gram of the polymer purified by dialysis and 0.3 g of triethylamine were dissolved in 100 ml of ethanol-water (1:1) mixed solvent to afford a semiemulsion solution.

Using this solution, composite membranes were similarly produced in the same way as in Example 1 except that different kind of crosslinking agents as shown in Table-3 were used.

The initial RO properties of these membranes were given in Table-3 together with those after drying test in the same way as in Example 6.

TABLE 3

| Ex. No. | Crosslinking Agent | Initial Properties W.F. (1/m². hr) | S.R. (%) | After Drying Test W.F. (1/m². hr) | S.R. (%) |
|---|---|---|---|---|---|
| 9 | ClC(O)-C₆H₄-COCl (meta) | 35.4 | 96.9 | 33.1 | 96.8 |
| 10 | benzene with SO₂Cl and two COCl groups | 67.8 | 93.2 | 61.4 | 93.3 |
| 11 | CH₃-C₆H₃(NCO)₂ | 19.8 | 99.2 | 17.2 | 99.4 |
| 12 | trichloro-triazine-trione (Cl/N/O ring) | 23.5 | 98.5 | 21.7 | 98.5 |

EXAMPLES 13 TO 15

5.7 g freshly distilled allylglycidyl ether and 3.4 g of SO₂ were dissolved in dimethyl sulfoxide together with 0.1 g of ammonium persulfate [(NH$_4$)$_2$.S$_2$O$_8$] to initiate a radical polymerization at 40° to 50° C.

After 4 hours, the reaction mixture was poured into an excess amount of acetone to precipitate 8.4 g of the polymer with the following structure whose inherent viscosity measured in N-methyl pyrrolidone at 30° C. was 0.78.

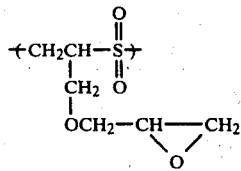

One gram of this polymer was added to 50 ml of 10% solution of aniline in N-methylpyrrolidone and heated at 40° C. for 3 hours to yield the aniline-modified polymer of the following structural unit with an amine equivalent of 2.6 milliequivalent per gram of the dried polymer.

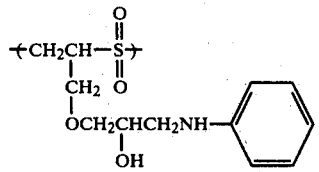

0.5 g of this polymer and 0.1 g of triethylamine were dissolved in a mixed solvent of 25 ml of isopropanol and 25 ml of water to give an emulsion. Composite membranes were obtained using this emulsion with the same procedure as in Example 1. RO test performances of these membranes were summarized in Table-4 together with their dry-wet reversibility.

TABLE 4

| Ex. No. | Crosslinking Agent | Initial Properties W.F. (1/m². hr) | S.R. (%) | Properties after Drying Test W.F. (1/m². hr) | S.R. (%) |
|---|---|---|---|---|---|
| 13 | ClC(O)-C₆H₄-COCl | 39.3 | 97.5 | 32.1 | 97.8 |
| 14 | ClC(O)-(CH₂)₈-COCl | 14.5 | 99.6 | 13.8 | 99.5 |
| 15 | ClC(O)-N(piperazine)N-COCl | 28.3 | 96.1 | 21.4 | 96.3 |

EXAMPLES 16 TO 18

4.3 g of distilled methyl acrylate and 7.1 g of glycidyl methacrylate were dissolved in 50 ml of dry benzen together with 0.2 g of azobisisobutyronitrile to initiate a radical polymerization at 80° C. After 8 hours, benzene was evaporated off the reaction mixture to yield 6.3 g of a pale yellow polymer which was proved to be a 1.7:1 copolymer of methyl acrylate and glycidyl methacrylate.

One gram of this polymer was reacted with an excess amount of N-methyl ethylene diamine in 50 ml of NMP at 30° C. for 3 hours, followed by a purification of the reaction mixture by dialysis to afford the amine-modified polymer with the following structural unit with an amine equivalent of 5.4 milliequivalent per gram of the dried polymer.

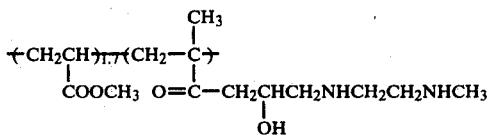

0.5 g of this polymer and 0.2 g of triethylamine were dissolved in 50 ml ethanol to be used as a casting solution for the fabrication of composite membranes with the same method as in Example 1. RO test performance of the membrane thus obtained was shown in Table-5 together with their dry-wet reversibility.

TABLE-5

| Ex. No. | Crosslinking Agent | Initial Performance W.F. (1/m². hr) | S.R. (%) | After Drying Test S.F. (1/m². hr) | S.R. (%) |
|---|---|---|---|---|---|
| 16 | 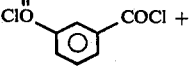 + | 98.3 | 90.5 | 87.5 | 90.9 |

TABLE-5-continued

| Ex. No. | Crosslinking Agent | Initial Performance W.F. (1/m². hr) | S.R. (%) | After Drying Test S.F. (1/m². hr) | S.R. (%) |
|---|---|---|---|---|---|
| | 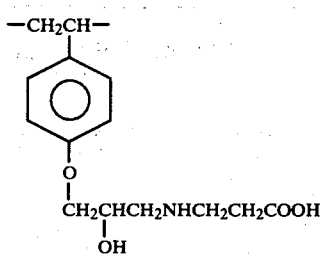 (5:1 by weight) | | | | |
| 17 | benzene with SO₂Cl, ClC(=O), COCl substituents | 81.7 | 91.3 | 73.9 | 90.9 |
| 18 | isochroman-1,3-dione with COCl substituent | 93.5 | 90.7 | 91.4 | 91.0 |

EXAMPLES 19 to 21

2 g of poly(4-hydroxystyrene) [Maruzene petroleum Ltd. molecular weight=15,000] and 1 g of KOH were dissolved in 30 ml of ethanol. To this solution was added 1.5 g of epichlorohydrin to react with the polymer at 70°–80° C. for 4 hours yielding the polymer with the following formula.

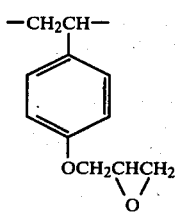

One gram of the polymer was reacted with 5 g of ω-carboxyethylamine in 50 ml of NMP at 50° C. for 3 hours to give the amine-modified polymer of the following structural unit with amine groups of 3.1 milliequivalent per gram of the dried polymer.

—CH₂CH—
  |
  C₆H₄
  |
  O
  |
  CH₂CHCH₂NHCH₂CH₂COOH
  |
  OH 0.5 g of this polymer and 0.2 g of KOH were dissolved in 50 ml of ethanol to be used for the subsequent composite membrane fabrication.

The RO test performances of the membranes prepared by the same method as in Example 1 were given in Table-6 together with their dry-wet durability.

TABLE 6

| Ex. No. | Crosslinking Agent | Initial Performance W.F. (1/m². hr) | S.R. (%) | After Drying Test W.F. (1/m². hr) | S.R. (%) |
|---|---|---|---|---|---|
| 19 | ClC(O)—C₆H₄—COCl | 23.3 | 98.1 | 21.1 | 98.0 |
| 20 | ClC(O)—C₆H₃(COCl)—COCl | 51.7 | 93.4 | 47.3 | 93.8 |
| 21 | OCN—C₆H₄—CH₂—C₆H₄—NCO | 12.9 | 99.5 | 11.5 | 99.4 |

EXAMPLE 22

Composite membranes of example 9, 10, 12, 18 and 19 were subjected to a dynamic chlorine resistance test under the same conditions as in examples 7 and 8 after the drying test.

The results were shown in Table-7.

TABLE 7

| Membrane No. | Initial Performance W.F.(1/m².hr) | S.R. (%) | Performance after 50 hours*[1] W.F.(1/m².hr) | S.R. (%) |
|---|---|---|---|---|
| Ex. 9 | 33.1 | 96.8 | 30.9 | 97.1 |
| 10 | 61.4 | 93.3 | 53.8 | 95.7 |
| 12 | 21.7 | 98.5 | 20.3 | 98.9 |
| 18 | 91.4 | 91.0 | 85.7 | 93.3 |
| 19 | 21.1 | 98.0 | 19.2 | 98.7 |

*[1]: Concentration of active chlorine 5 ppm, pH 6.5 to 6.0.

What we claim is:

1. A semipermeable composite membrane comprising a thin semipermeable film of a polymeric material deposited on one side of a microporous substrate, said polymeric material being prepared by crosslinking a soluble polymer containing at least 30 mole% of a recurring unit of the formula

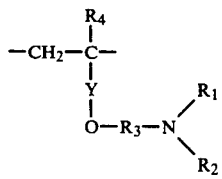

(I)

wherein

Y represents a direct bond, a methylene group, a carbonyl group of the formula $$-\overset{O}{\underset{\|}{C}}-$$

or an unsubstituted or substituted phenylene group;

$R_1$ represents a hydrogen atom, or a mono-valent organic radical containing 1 to 20 carbon atoms which may contain an amino group containing 1 to 2 active hydrogen atoms and a heteroatom selected from the group consisting of oxygen, nitrogen and sulfur atoms;

$R_2$ represents a hydrogen atom, an amino group containing 1 to 2 active hydrogen atoms or a monovalent oganic radical containing 1 to 20 carbon atoms and which contains at least one amino group containing 1 to 2 active hydrogen atoms and which may contain a heteroatom selected from the group consisting of oxygen, nitrogen and sulfur atoms;

$R_1$ and $R_2$, together with the nitrogen atom to which they are bonded may represent a 5- to 18-membered nitrogen-containing heterocyclic ring which contains at least one amino group having one active hydrogen atom;

$R_3$ represents an alkylene group containing 2 to 5 carbon atoms which may have an —OH group;

$R_4$ represents a hydrogen atom or a methyl group, and having at least 0.5 milliequivalent, per gram of said polymer, of an amino group containing 1 or 2 active hydrogen atoms, with a polyfunctional compound containing at least two functional groups capable of reacting with the amino group having 1 or 2 active hydrogen atoms.

2. The membrane of claim 1 wherein said polymer contains at least 50 mole% of the recurring unit of formula (I).

3. The membrane of claim 1 wherein Y represents a direct bond.

4. The membrane of claim 1 wherein group

represents a monovalent substituted amino group resulting from the removal of one active hydrogen atom from one of the amino groups of an amino compound containing at least one amino group with 1 or 2 active hydrogen atoms.

5. The membrane of claim 1 wherein $R_1$ represents a hydrogen atom, or an alkyl, cycloalkyl, aryl, aralkyl or heterocyclic group containing 1 to 20 carbon atoms which may contain 1 to 8 heteroatoms or heteroatom-containing atomic groupings selected from the group consisting of thiol groups, sulfo groups, hydroxyl groups, cyano groups, carboxyl groups, alkoxycarbonyl groups with the alkyl moiety containing 1 to 5 carbon atoms, primary amino groups, either linkages, imino linkages and tertiary amino linkages $R_2$ represents a hydrogen atom, a primary amino group, a secondary amino group monosubstituted by an alkyl group containing 1 to 5 carbon atoms, or an alkyl, cycloalkyl, aryl, aralkyl or heterocyclic group containing 1 to 20 carbon atoms which contains 1 to 10 primary amino groups or imino linkages and may contain 1 to 9 heteroatoms or heteroatom-containing atomic groupings selected from the group consisting of thiol groups, sulfo groups, hydroxyl groups, cyano groups, carboxyl groups, alkoxycarbonyl groups with the alkyl moiety containing 1 to 5 carbon atoms, ether linkages and tertiary amino linkages; or $R_1$ and $R_2$, together with the nitrogen atom to which they are bonded, may represent a 5- to 18-membered heterocyclic ring which contains at least one amino group having one active hydrogen atom and may contain 1 to 4 nitrogen or oxygen atoms as heteroatoms.

6. The membrane of claim 4 wherein said amino compound is a compound expressed by the following formulae $$A_1-NH-A_2-NH_2 \quad (II\text{-}a)$$

$$NH_2 \!\!-\!\!(CH_2-CH_2-N)\!\!-\!\!A_3 \quad (II\text{-}6)$$
$$\qquad\qquad\qquad |$$
$$\qquad\qquad\qquad A_4$$

or $$A_5-NH_2 \quad (II\text{-}c)$$

wherein $A_1$ represents a hydrogen atom or a lower alkyl group; $A_2$ represents an alkylene group having 1 to 10 carbon atoms which may contain an ether linkage;

$A_3$ represents a hydrogen atom or a lower alkyl group optionally substituted with a cyano, hydroxyl or lower alkoxycarbonyl group; $A_4$ represents a hydrogen atom or a group of the formula —CH$_2$—CH$_2$—NH—A$_3$; with the proviso that $A_3$ and $A_4$ do not represent a hydrogen atom simultaneously;

$A_5$ represents an alkyl group with 1 to 4 carbon atoms, a phenyl group or a cycloalkyl group with 5 to 6 carbon atoms, wherein each group may have a substituent group selected from acid groups of the formula —COOH and —SO$_3$H, alkali metal salts of said acid groups, alkaline earth metal salts of said acid groups, ammonium salts of said acid groups, a thiol group and a hydroxy group; with the proviso that the alkyl group does not contain a sulfo group or said salt thereof, the phenyl group does not contain a thiol group or a hydroxy group and the cycloalkyl group does not contain a sulfo group, said salt thereof or a thiol group; and i is an integer of 2 to 6.

7. The membrane of claim 4 wherein said amino compound is a compound expressed by the following formula $$NH_2-CH_2-(\!CH_2-NH\!)_{\overline{i}}H \quad (II\text{-}a\text{-}1)$$

wherein i is an integer of 2 to 6.

8. The membrane of claim 1 wherein said polymer is a polymer consisting essentially of the recurring unit of formula (I).

9. The membrane of claim 1 wherein said polymer is a copolymer composed of a recurring unit of formula (I-a)

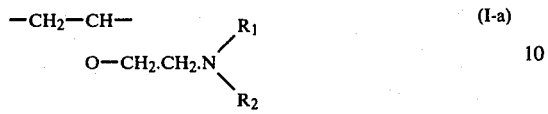 (I-a)

where $R_1$ and $R_2$ are as defined in claim 1, and at least one other recurring unit derived from a radical polymerizable monomer containing one ethylenically unsaturated bond.

10. The membrane of claim 9 wherein said monomer containing one ethylenically unsaturated bond contains 2 to 10 carbon atoms.

11. The membrane of claim 9 wherein said monomer containing one ethylenically unsaturated bond has a molecular weight of 28 to 200.

12. The membrane of claim 9 wherein said monomer is a compound represented by the following formula (III-1)

 (III-1)

wherein
$R_6$ represents a hydrogen atom or an alkoxycarbonyl group with the alkyl moiety containing 1 to 10 carbon atoms;

$R_7$ represents a hydrogen or halogen atom or a methyl group;

$R_8$ represents a hydrogen or halogen atom, an alkoxy group containing 1 to 10 carbon atoms optionally substituted by a hydroxyl group and/or a halogen atom, an alkoxycarbonyl group with the alkyl moiety containing 1 to 10 carbon atoms, an alkanoyl group containing 1 to 10 carbon atoms, an alkanoyloxy group containing 1 to 10 carbon atoms, an alkyl group consisting 1 to 10 carbon atoms substituted by a group of the formula $—SO_3M$ or hydroxyl group, a phenyl group optionally substituted by the group $—SO_3M$ or a methyl group, a glycidyloxy group, or a group of the formula $+B—O+_jH$ in which B represents an ethylene or propylene group, and j is an integer of 1 to 8; and M represents an alkali atom.

13. The membrane of claim 1 wherein said polymer is a copolymer composed of
(A) at least 50 mole% of the recurring unit of formula (I-a)

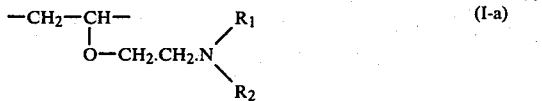 (I-a)

where $R_1$ and $R_2$ are as defined in claim 1, and
(B) up to 50 mole% of at least one recurring unit of the formula

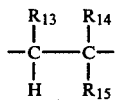

wherein
$R_{13}$ represents a hydrogen atom or an alkoxycarbonyl group with the alkyl moiety containing 1 to 10 carbon atoms;

$R_{14}$ represents a hydrogen or halogen atom or a methyl group;

$R_{15}$ represents a hydrogen or halogen atom, an alkoxy group containing 1 to 10 carbon atoms optionally mono- or di-substituted by a hydroxyl group and/or a halogen atom, an alkoxycarbonyl group with the alkyl moiety containing 1 to 10 carbon atoms, an alkanoyl group containing 1 to 10 carbon atoms, an alkanoyloxy group containing 1 to 10 carbon atoms, an alkyl group containing 1 to 10 carbon atoms which may be mono-substituted by a group of the formula $—SO_3M$ or a hydroxy group, a phenyl group optionally mono-substituted by the group $—SO_3M$ or a methyl group, a glycidyloxy group, a group of the formula $(B—O)_jH$ in which B represents an ethylene or propylene group and j is an integer of 1 to 8, a group of the formula

a group of the formula

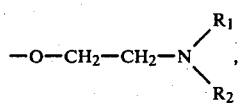

a group of the formula

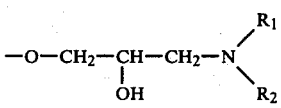

in which $R_1$ and $R_2$ are defined hereinabove;
$R_{13}$ and $R_{14}$ together may represent an ethylenedioxy group;
$R_{14}$ and $R_{15}$ together may represent

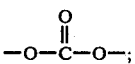

and M represents an alkali metal atom.

14. The membrane of claim 1 wherein said polymer has a solubility of at least 0.1 g at 25° C. in 100 g of water or a water-miscible polar organic solvent.

15. The membrane of claim 1 wherein said polymer has a solubility of at least 0.5 g at 25° C. in 100 g of water or a water-miscible polar organic solvent.

16. The membrane of claim 14 or 15 wherein said organic solvent is selected from the group consisting of lower alcohols, formic acid, dimethylformamide, dimethylsulfoxide, tetramethylenesulfone and N-methylpyrrolidone.

17. The membrane of claim 1 wherein said polymer has an inherent viscosity, determined at 30° C. in water or a water-miscible polar organic solvent selected from the group consisting of lower alcohols, formic acid, dimethylformamide, dimethylsulfoxide, tetramethylenesulfone and N-methylpyrrolidone at 0.5% by weight of the polymer solution, of at least 0.15 dl/g.

18. The membrane of claim 1 wherein said polymer has an inherent viscosity, determined at 30° C. in water or a water-miscible polar organic solvent selected from the group consisting of lower alcohols, formic acid, dimethylformamide, dimethylsulfoxide, tetramethylenesulfone and N-methylpyrrolidone at 0.5% by weight of the polymer solution, of 0.10 to 5.0 dl/g.

19. The membrane of claim 1 wherein said polyfunctional compound is a polyfunctional compound containing at least two functional groups selected from the group consisting of acid halide, sulfonyl halide, isocyanate, N-haloformyl, haloformate and acid anhydride groups, or cyanuric chloride.

20. The membrane of claim 1 wherein the polyfunctional compound is an aromatic, heterocyclic or alicyclic compound.

21. The membrane of claim 1 wherein the polyfunctional compound is an aromatic compound.

22. The membrane of claim 1 wherein the polyfunctional compound is a di- or tri-functional aromatic compound containing two or three functional groups selected from the group consisting of acid halide, sulfonyl halide and acid anhydride groups.

23. The membrane of claim 1 wherein the polyfunctional compound is a trifunctional aromatic compound, or a mixture of a difunctional aromatic compound and a trifunctional aromatic compound.

24. The membrane of claim 23 wherein the di- or tri-functional aromatic compound is isophthaloyl chloride, terephthaloyl chloride, trimesoyl chloride, 3-chlorosulfonylisophthaloyl chloride, or cyanuric acid chloride.

25. The membrane of claim 1 wherein said thin semipermeable film has a thickness of at least about 100 Å.

26. The membrane of claim 1 wherein said microporous substrate is composed of an asymmetrical membrane of an aromatic polysulfone.

27. In a method for desalination of saline or brackish water by reverse osmosis comprising contacting the saline or brackish water under pressure with a reverse osmosis membrane, the improvement wherein the membrane of claim 1 is used as the reverse osmosis membrane.

28. A process for producing a sermipermeable composite membrane which comprises
(a) crosslinking, on a microporous substrate or on a water solution, (i) a soluble polymer containing at least 30 mole % of a recurring unit of formula (I)

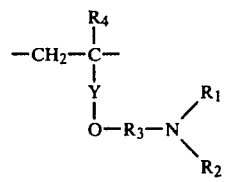

wherein
Y represents a direct bond, a methylene group, a carbonyl group of the formula

or an unsubstituted or substituted phenylene group;
$R_1$ represents a hydrogen atom, or a monovalent organic radical containing 1 to 20 carbon atoms which may contain an amino group containing 1 to 2 active hydrogen atoms and a heteroatom selected from the group consisting of oxygen, nitrogen and sulfur atoms;
$R_2$ represents a hydrogen atom, an amino group containing 1 to 2 active hydrogen atoms or a monovalent organic radical containing 1 to 20 carbon atoms which contains at least one amino group containing 1 to 2 active hydrogen atoms and may contain a heteroatom selected from the group consisting of oxygen, nitrogen and sulfur atoms;
$R_1$ and $R_2$, together with the nitrogen atom to which they are bonded, may represent a 5- to 18-membered nitrogen-containing hetero-cyclic ring which contains at least one amino group having one active hydrogen atom;
$R_3$ represents an alkylene group containing 2 to 5 carbon atoms which may have an —OH group; and
$R_4$ represents a hydrogen atom or a methyl group, and having at least 0.5 milliequivalent, per gram of said polymer, of an amino group containing 1 or 2 active hydrogen atoms, with (ii) a polyfunctional compound containing at least two functional groups capable of reacting with the amino groups having one or two active hydrogen atoms, and
(b) when the crosslinking reaction is carried out on a water solution, placing the thus formed membrane on a microporous substrate, and
(c) optionally heating the membrane and substrate to ensure bonding thereof.

29. The process of claim 28, wherein said cross-linking comprises
(a) treating said microporous substrate with said solution containing said soluble polymer containing at least 30 mole % of a recurring unit of the formula (I),
(b) contacting the treated microporous substrate interfacially with said solution of said polyfunctional compound containing at least two functional groups capable of reacting with the amino groups groups having 1 or 2 active hydrogen atoms, and
(c) then optionally heating such to form a thin film of the crosslinked polymer having semipermeability on one side of the microporous substrate.

30. The process of claim 29 wherein the resulting composite membrane is coated with a water-soluble organic polymer.

31. The process of claim 30 wherein the water-soluble organic polymer is polyvinyl alcohol, polyvinyl pyrrolidone or polyvinyl methyl ether.

* * * * *